(12) United States Patent
McCarson et al.

(10) Patent No.: US 11,755,689 B2
(45) Date of Patent: Sep. 12, 2023

(54) METHODS, SYSTEMS, ARTICLES OF MANUFACTURE AND APPARATUS TO MANAGE PROCESS EXCURSIONS

(71) Applicant: Intel Corporation, Santa Clara, CA (US)

(72) Inventors: Brian McCarson, Chandler, AZ (US); Keith Ellis, Carlow (IE); Michael McGrath, Virginia (IE); Niall Cahill, Dublin (IE); Lisa Sherin, Dublin (IE); Daire Healy, Enfield (IE)

(73) Assignee: Intel Corporation, Santa Clara, CA (US)

( * ) Notice: Subject to any disclaimer, the term of this patent is extended or adjusted under 35 U.S.C. 154(b) by 939 days.

(21) Appl. No.: 16/450,123

(22) Filed: Jun. 24, 2019

(65) Prior Publication Data
US 2019/0340843 A1 Nov. 7, 2019

(51) Int. Cl.
| | |
|---|---|
| G07C 3/14 | (2006.01) |
| G06F 18/24 | (2023.01) |
| G05B 13/04 | (2006.01) |
| G06N 5/022 | (2023.01) |
| G05B 13/02 | (2006.01) |
| G05B 19/418 | (2006.01) |

(52) U.S. Cl.
CPC ......... *G06F 18/24* (2023.01); *G05B 13/0265* (2013.01); *G05B 13/04* (2013.01); *G06N 5/022* (2013.01); *G07C 3/146* (2013.01); *G05B 19/41875* (2013.01)

(58) Field of Classification Search
USPC ......................................................... 700/116
See application file for complete search history.

(56) References Cited

U.S. PATENT DOCUMENTS

2020/0226742 A1 * 7/2020 Sawlani ................ G06T 7/0004

FOREIGN PATENT DOCUMENTS

WO WO-2016132538 A1 * 8/2016

OTHER PUBLICATIONS

Grieves, "Digital Twin: Manufacturing Excellence through Virtual Factory Replication" A Whitepaper by Dr. Michael Grieves, Mar. 2015, 9 pages (Year: 2015).*
Marr, "7 Amazing Examples of Digital Twin Technology in Practice," Apr. 23, 2019, 4 pages. Retrieved from https://www.forbes.com/sites/bernardmarr/2019/04/23/7-amazing-examples-of-digital-twin-technology-in-practice/#f597ffd6443b.
Marr, "What is Digital Twin Technology—and Why is it so Important?" Mar. 6, 2017, 4 pages. Retrieved from https://www.forbes.com/sites/bernardmarr/2017/03/06/what-is-digital-twin-technology-and-why-is-it-so-important/#4d5ad9bb2e2a.

* cited by examiner

*Primary Examiner* — Emilio J Saavedra
(74) *Attorney, Agent, or Firm* — Hanley, Flight & Zimmerman, LLC

(57) ABSTRACT

Methods, apparatus, systems and articles of manufacture are disclosed to manage process excursions. An example apparatus includes a digital twin comparer to determine when a product fails to satisfy a tolerance metric of a digital twin, and a fingerprint manager to generate a fingerprint corresponding to a sensor pattern. The example apparatus also includes a node interfacer to determine a number of workstations of a process control system that exhibit the fingerprint, and an excursion statistics calculator to invoke a corrective action for respective ones of the number of workstations, the corrective action based on a threshold count of the number of workstations that exhibit the fingerprint.

17 Claims, 13 Drawing Sheets

METHODS, SYSTEMS, ARTICLES OF MANUFACTURE AND APPARATUS TO MANAGE PROCESS EXCURSIONS

FIELD OF THE DISCLOSURE

This disclosure relates generally to process control, and, more particularly, to methods, systems, articles of manufacture and apparatus to manage process excursions.

BACKGROUND

In recent years, process control has experienced a growth in demand for quality control. Process control systems manufacture and/or otherwise produce products in a manner intended to conform to particular dimensional constraints, material characteristic constraints and/or operational constraints. Typically, products manufactured with a process control system are modified in a series manner at any number of stations, in which each station utilizes one or more tools on the products being manufactured. Such tools may experience a degree of degrading efficacy as a number of manufacturing iterations increases.

BRIEF DESCRIPTION OF THE DRAWINGS

The figures are not to scale. In general, the same reference numbers will be used throughout the drawing(s) and accompanying written description to refer to the same or like parts.

Figure 1:
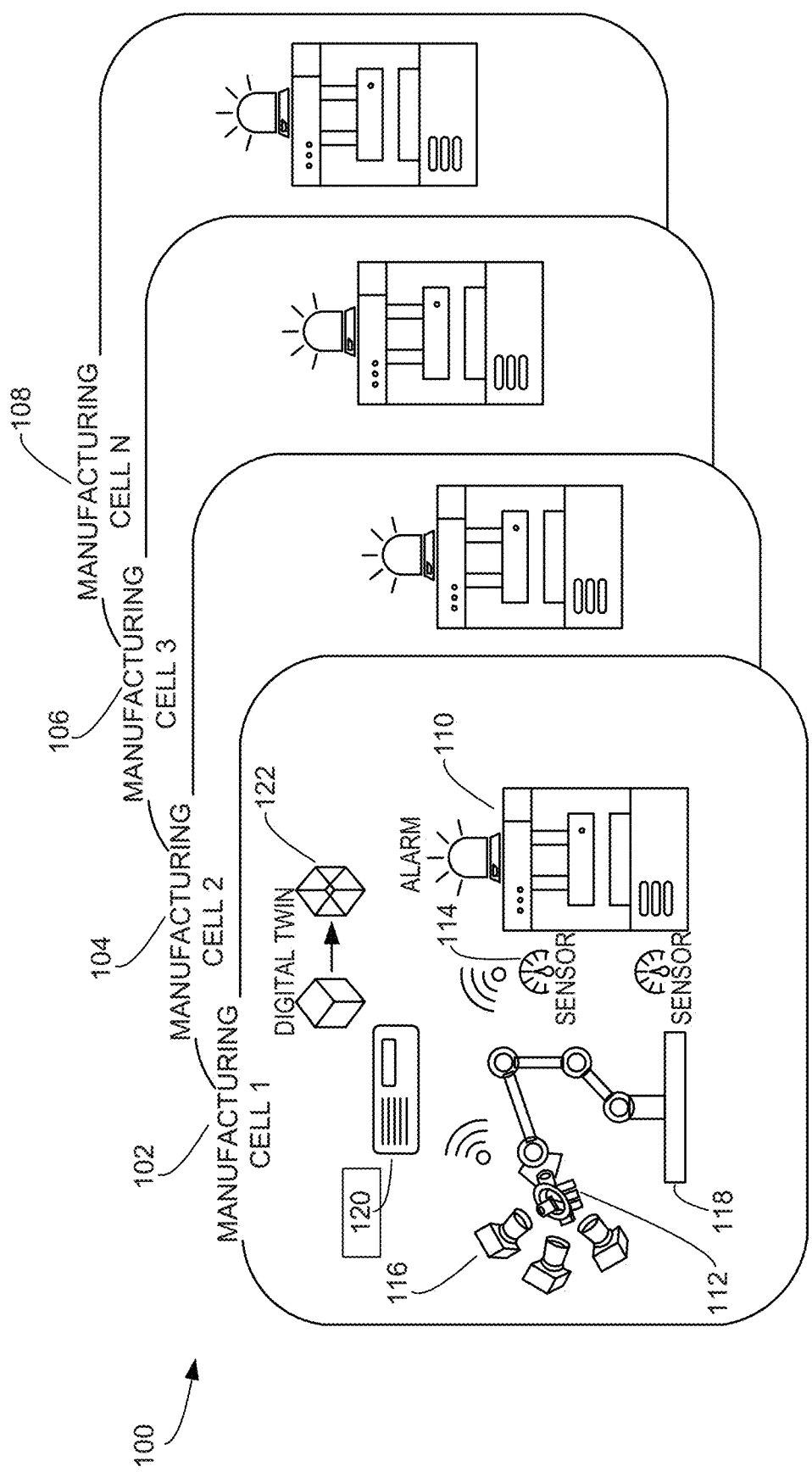
FIG. 1 is a schematic illustration of an example portion of a cyber physical system (CPS) suitably constructed in accordance with teachings of this disclosure to manage process excursions.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Manufacturing environments using cyber physical systems (CPSs) integrate physical control and/or manipulation with computational feedback at edge nodes of a network. As used herein, an edge node is a computing device connected to a network capable of supporting one or more different communication paths. Example edge nodes connect with any number of sensors and/or actuators of a manufacturing stage/station to execute a recipe/control process designed to augment a product in a manner that conforms to predetermined specifications. However, typical CPSs and/or edge nodes of the CPS do not cooperate with adjacent stages/stations regarding detection of process excursions and/or cooperation with the other stages/stations with information that will help in early identification of process excursions. As used herein, an excursion is an instance of non-conformity of the product of interest, such as, for example, a dimension that fails to meet a tolerance threshold value, an electrical characteristic that fails to meet a tolerance threshold value, or a weight characteristic that fails to meet a tolerance value. Additionally, in the event excursions are caused by variations to a process supply line (e.g., raw materials used in the process), typical process control systems inherently assume that efforts to adaptively control the process steps (e.g., the recipe) to maintain predefined set points through approaches such as model-based control and/or proportional-integral-derivative (PID) control techniques.

Examples disclosed herein facilitate CPS process control using a digital twin to manage process excursions, thereby allowing an improved responsivity to process control changes before such excursions cause product waste, manufacturing downtime and/or damage to process control equipment. In some examples disclosed herein, an excursion effect on the product or process control equipment is identified. In some examples, process excursions are not detected during a window of opportunity when preventative maintenance can avoid irreparable damage to the one or more tools of the process control system. Process control tools may include, but are not limited to, molds (e.g., injection molds), extrusion casings, metal stamps, etc. In still other examples, process control tools include semiconductor manufacturing tools (e.g., plasma etchers), chemical/pharmaceutical manufacturing tools, continuous process equipment, automotive part manufacturing tools, metal forming tools, milling tools, turning tools, machining tools, grinding tools, casting tools (e.g., foundry tools), rapid prototyping tools, 3D printing tools, medical device testing tools, etc. As such tools are used to manufacture products, variations (e.g., dimensional, material, chemical, electrical, etc.) may occur to the tool that cause a resulting operation to produce a product/part that is no longer within acceptable tolerance metrics. As used herein, metrics refer to any type of parameter associated with a manufacturing end-product that is to be controlled in a manner to successfully generate the end-product.

While the typical manufacturing process includes a particular number of operations/steps to accomplish compliance with a template, examples disclosed herein employ a digital twin. As used herein, a digital twin is a digital replica of a physical asset, such as a manufactured part. The digital twin includes characteristics of the physical asset at each stage of the manufacturing process, in which the characteristics include, but are not limited to, coordinate axis dimensions, weight characteristics, material characteristics (e.g., density, surface roughness), electrical characteristics (e.g., conductivity), optical characteristics (e.g., reflectivity), etc.

As disclosed in further detail below, because process control environments include any number of different dynamic circumstances, traditional methods of strictly adhering to forcing the same process recipe fail to yield products having characteristics that comply with design specifications. Such compliance failures are caused, in some circumstances, by different types of excursions related to inbound material deviation(s), tool wear, environmental conditions, etc. Examples disclosed herein employ a deterministic classification of excursions relative to a catalog of known excursion fingerprints. As described in further detail below, when a particular excursion occurs a threshold number of times, new fingerprints are generated to allow future detection of such excursions in a more efficient manner (e.g., faster excursion detection, thereby resulting in less wasted material, less wasted processing time, improved process safety, etc.). Examples disclosed herein also dynamically adjust the recipe/process sequence in response to detected deviations of product output when compared to the digital twin(s).

FIG. 1 is a schematic illustration of a cyber physical system (CPS) 100. In some examples, the CPS 100 is in a factory environment, a laboratory environment, or a warehouse. In some examples, the CPS 100 is an overlay on an existing manufacturing system, in which the example CPS 100 includes communicatively connected edge nodes. In the illustrated example of FIG. 1, the CPS 100 includes any number of manufacturing cells (process control nodes, edge nodes, etc.), in which each manufacturing cell operates as a process station to augment one or more products or product assemblies. The example CPS 100 of FIG. 1 includes a first manufacturing cell 102, a second manufacturing cell 104, a third manufacturing cell 106, and an n$^{th}$ manufacturing cell 108 to represent a capability that the example CPS 100 can include any number of different manufacturing cells. For purposes of convenience and not limitation, references below will focus on the example first manufacturing cell 102.

The example first manufacturing cell 102 of FIG. 1 includes an example manufacturing tool 110 that performs one or more operation(s) on an example product 112. The example first manufacturing cell 102 includes any number of sensors 114 to provide data/information related to the example manufacturing tool 110, the example product 112 and/or environmental conditions of the example first manufacturing cell 102. The example first manufacturing cell 102 also includes imaging devices 116 (e.g., cameras) to assess different characteristics of the product 112. In some examples, the imaging devices 116 acquire pre-process characteristics of the product 112, and in some examples the imaging devices 116 acquire post-process characteristics of the product 112. In some examples, the imaging devices 116 include Light Detection and Ranging (LiDAR) systems to illuminate the part(s) with pulsed laser light and measure reflected pulses to derive surface contour characteristics of the part(s). In some examples, the product 112 is manipulated (e.g., moved, re-orientated, etc.) with an example robotic arm 118, which may include one or more of the sensors 114. For instance, the example robotic arm 118 may include a strain gauge or weight sensor to provide weight characteristics of the example product 112. While the illustrated example of FIG. 1 includes a robotic arm 118 to manipulate and/or otherwise move the example product 112, examples disclosed herein are not limited thereto. In some examples, the product 112 may be manipulated and/or otherwise transported via an assembly line or via human operators.

In the illustrated example of FIG. 1, the example manufacturing tool 110, the example sensors 114, the example imaging devices 116 and/or the example robotic arm 118 are communicatively connected to an edge node 120. The example edge node 120 is a computing device having input/output capabilities to facilitate process control operations in a manner consistent with a process sequence (recipe) associated with its particular manufacturing cell. Additionally, characteristics of the example product 112 augmented by the example manufacturing cell are compared against an example digital twin 122. As described in further detail below, because the example edge node 120 is communicatively connected to any number of other manufacturing cells (e.g., the second manufacturing cell 104, the third manufacturing cell 106, etc.), knowledge gained from tasks at the example first manufacturing cell 102 is shared with the other manufacturing cells. Additionally, unlike typical manufacturing systems with a static process sequence (recipe), examples disclosed herein modify the digital twin to improve a degree of product manufacturing accuracy, decrease product waste, and improve manufacturing efficiency (e.g., product augmentation occurs in less time).

Excursion Manager

Figure 2:
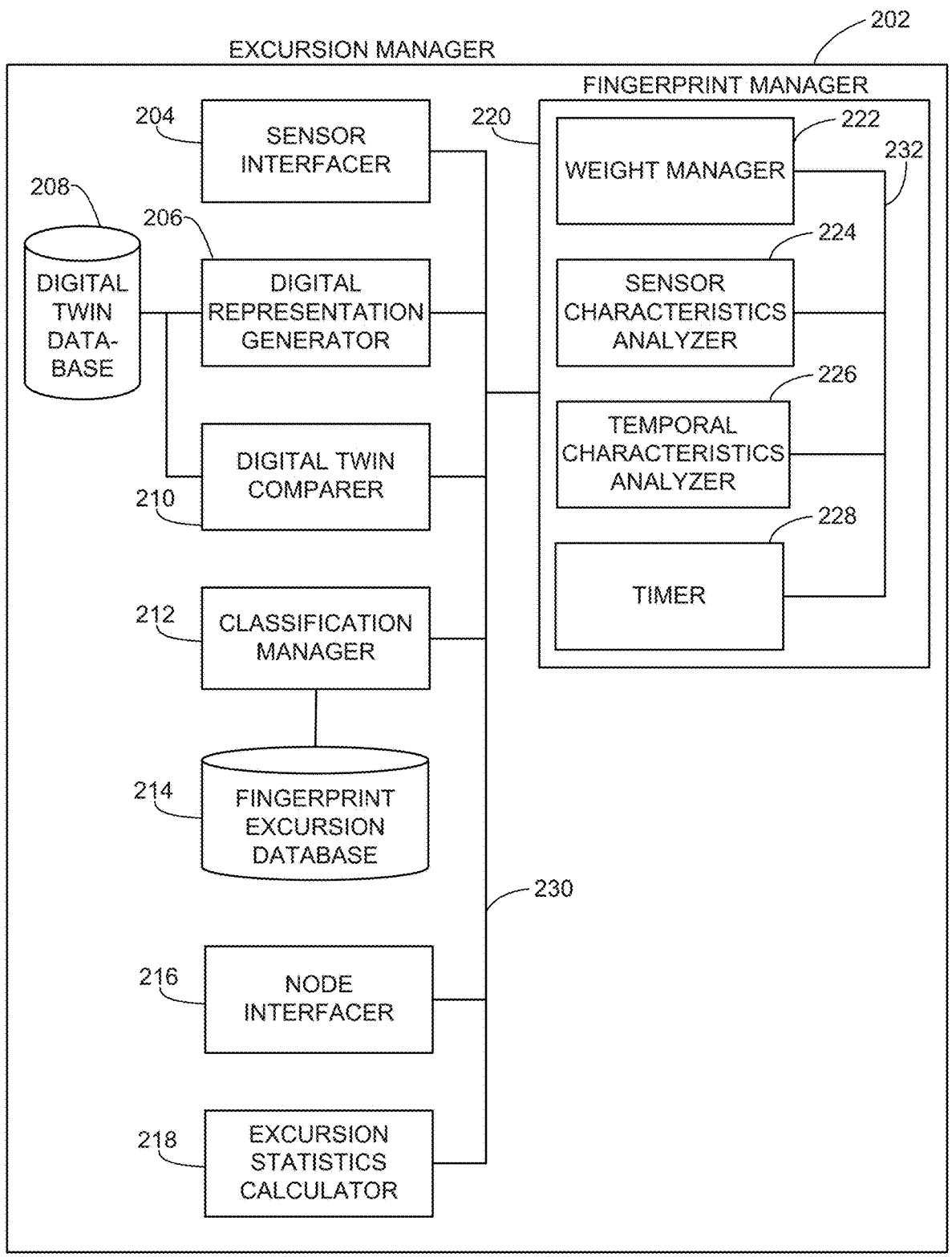
FIG. 2 is a schematic illustration of an example excursion manager to manage process excursions in accordance with teachings of this disclosure.

FIG. 2 is a schematic illustration of an example excursion manager 202 to manage process excursions (e.g., in a process control system). The example excursion manager 202 is part of the example edge node 120 of a manufacturing cell (e.g., the example first manufacturing cell 102), but the example excursion manager 202 may, alternatively, operate as stand-alone structure external to the example edge node 120. In the illustrated example of FIG. 2, the excursion manager 202 includes an example sensor interfacer 204, a digital representation generator 206, and a digital twin comparer 210. The example digital representation generator 206 and the example digital twin comparer 210 are communicatively connected to an example digital twin database 208.

The example excursion manager 202 of FIG. 2 also includes an example classification manager 212 communicatively connected to an example fingerprint excursion database 214. The example excursion manager 202 of FIG. 2 also includes an example node interfacer 216, an example excursion statistics calculator 218, and an example fingerprint manager 220. The aforementioned structure and/or software (depending on the manner of implementation to manage process excursions) of FIG. 2 is communicatively connected (and/or interconnected) by an example excursion manager bus 230.

The example fingerprint manager 220 of FIG. 2 includes an example weight manager 222, an example sensor characteristics analyzer 224, an example temporal characteristics analyzer 226, and an example timer 228. The aforementioned structure and/or software (depending on the manner of implementation to manage process excursions) of the fingerprint management ending 220 is communicatively connected by an example fingerprint management bus 232.

In operation, the example sensor interfacer 204 retrieves and/or otherwise receives sensor data from a manufacturing cell, such as the example first manufacturing cell 102 of FIG. 1. The example manufacturing cell includes any number of tools (e.g., example manufacturing tool 110 of FIG. 1) that operate on a product of interest (e.g., raw materials modified by the tool). Example sensor data may include, but is not limited to, process control sensors (e.g., temperature sensors, vibration sensors, beam-break sensors, safety interlock sensors, etc.), actuator status sensors, image sensors (e.g., the example imaging devices 116 of FIG. 1), etc. In particular, the example sensor interfacer 204 retrieves information corresponding to a product of interest that has been operated on by the manufacturing cell. The information corresponding to the product of interest may include, but is not limited to, dimensional characteristics of the product of interest (e.g., x-coordinate values, y-coordinate values, z-coordinate values), surface characteristics of the product of interest (e.g., smoothness, durometer, etc.), optical characteristics of the product of interest (e.g., reflectivity, luster, transparency, color, etc.), electrical characteristics of the product of interest (e.g., conductivity, resistivity, etc.), etc.

While the example manufacturing cell may perform one or more operations in furtherance of a product of interest, different environmental conditions, equipment conditions and/or raw material conditions may cause the product of interest to exhibit one or more excursions. As used herein, a finished product of interest reflects a product, part or assembly of parts operated on by one or more tools of one or more manufacturing cells. Each manufacturing cell may be one stage in a multi-stage manufacturing process in which the product of interest is augmented in a particular manner in furtherance of creating a finished product of interest upon completion of a series of manufacturing cells. As described above, excursions may be caused by variations in raw materials of a supply line to the example manufacturing cell. To further characterize and/or analyze conformance with one or more tolerance threshold values of the product of interest, the example sensor interfacer 204 collects data corresponding to the product of interest, in which such data is obtained from different sensors of the manufacturing cell (e.g., multimodal cameras, weight sensors, smoothness detectors, etc.) and the example digital representation generator 206 calculates a digital representation of the product of interest. Stated differently, the digital representation of the product of interest allows comparisons of metrics associated with a digital twin. In some examples, the digital representation of the product of interest is a list of detected characteristics, such as a list including the product length, the product height, the product width, the product weight, the product resistivity, etc. In some examples, the digital representation generator 206 stores the digital representation in a local storage, such as within the example digital twin database 208.

The example digital twin comparer 210 retrieves a digital twin from the example digital twin database 208 and determines whether the product of interest is within one or more tolerance values. In some examples, the digital twin comparer 210 determines when the product of interest fails to satisfy one or more tolerance metrics associated with the digital twin. In some examples, the digital twin comparer 210 determines a temporal characteristic of when such tolerance metrics fail to satisfy particular threshold values specified by the digital twin. In some examples, the digital twin is retrieved from a secure storage location, such as a secure enclave (e.g., the Intel® software guard extension (SGX) instruction set to partition memory for secure operation(s)). If the tolerance values are satisfied (e.g., not violated, not exceeded, etc.), then the example manufacturing cell 102 is operating correctly. However, in the event the example digital twin comparer 210 determines that the product of interest does not satisfy (e.g., exceeds) one or more tolerance values, then the example fingerprint manager 220 generates a process fingerprint. As used herein, a fingerprint is a subset of data corresponding to process operations that occur in connection with detection of an excursion. Generally speaking, while one or more excursions may be relatively easy to detect by referencing product characteristics of a manufactured product against the digital twin, corresponding circumstances, variables and/or nuances leading up to that excursion (preceding the excursion detection at a first time) may not be easy and/or otherwise straightforward to detect. In some examples, a confluence of dozens, hundreds or thousands of particular characteristics may exhibit particular values that cause the particular excursion. All such characteristics detected by different sensors in the manufacturing cell are used to generate a process fingerprint. To aid in the dissemination of what could be thousands of different characteristics, the example classification manager 212 classifies the fingerprint against a knowledgebase (e.g., a database) of known process excursion fingerprints to find a closest match. Stated differently, when a particular confluence of different process characteristics occurs and is classified, future occurrences of such process activity can be detected in an effort to take preventative measures prior to the occurrence of process cycle time waste, raw material waste, safety concerns, and/or permit initialization of preventative maintenance tasks. Stated differently, in response to identifying a fingerprint match against the knowledgebase, the example classification manager 212 invokes one or more preventative measures (e.g., preventative maintenance procedure(s)) and/or corrective actions to improve the process and/or a product manufactured by the process.

If the example fingerprint manager 220 determines a matching fingerprint, then the example classification manager 212 determines context information associated with the excursion. Additionally, the example excursion statistics calculator 218 determines trending details associated with the excursion, which can be helpful in making decisions on when and/or how to perform different types of preventative maintenance operation(s) on the manufacturing cell(s) and/or tools used therein. However, in the event that the example fingerprint manager 220 determines that there is no fingerprint match (e.g., in a knowledge database), then the fingerprint is deemed new and is added to the example fingerprint excursion database 214. As described in further detail below, the newly discovered fingerprint assists in detection and root cause analysis of excursions occurring in the example manufacturing cell 102. Additionally, and as described in further detail below, the new fingerprints are shared by the example edge node 120 with one or more other manufacturing cells. In some examples, the edge nodes associated with each manufacturing cell coordinate and exchange different information (e.g., excursion fingerprints) via, for example, an automatic control plane (ACP) (e.g., built upon the Internet Engineering Task Force (IETF) automatic control specification RFC7575).

As described above, the example fingerprint manager 220 is chartered with the responsibility of generating a process fingerprint in response to detecting an excursion. The fingerprint manager 220 invokes the example sensor interfacer 204 to clean the retrieved sensor data. In some examples, the sensor interfacer 204 identifies instances of duplicate data to be removed, removes data in response to identifying instances of data that is not complete, and/or removes data that does not correspond to an acceptable format type (e.g., text data vs. integer data, etc.). For instance, collected sensor data associated with the process that recently exhibited an excursion may be collected for a threshold period of time leading-up to the detected excursion (e.g., 10 seconds of all available sensor data). The example fingerprint manager 220 generates at least one fingerprint to aid in classification operations. As described in further detail below in the illustrated example of FIG. 5, two separate fingerprints are generated by the example fingerprint manager 220, but examples disclosed herein may employ any number of fingerprints. For an example first fingerprint, the example weight manager 222 applies weighting to the sensor data. Weight values are determined by the example weight manager 222 such that particular parameters reflect a particular influence on process stability, on output, etc. In some examples, tables, heuristics and/or lists store generalized guidance on weight values to be applied in different process circumstances. For instance, some processes are typically influenced to a greater degree by temperature variations as compared to pressure variations and, as such, corresponding weight values are applied by the weight manager 222 to reflect such typical expectations.

The example sensor characteristics analyzer 224 determines one or more patterns that might be related to the excursion(s) detected. In some examples, the sensor characteristics analyzer 224 identifies a sensor type pattern corresponding to sensor value occurrences that occur during a period of time leading up to a detection of an excursion. Stated differently, the example sensor characteristics analyzer 224 identifies which types of sensors and/or sensor values during this time period. Based on the aforementioned weights and identified patterns, the example fingerprint manager 220 generates a characteristics-based fingerprint (e.g., the first fingerprint). For a second fingerprint, the example temporal characteristics analyzer 226 calculates temporal characteristics of the (unweighted) sensor data. In some examples, the temporal characteristics analyzer 226 determines a pattern match of sensor triggers for a specified time window. For instance, a duration of a process step may be split by the temporal characteristics analyzer 226 into three time windows; one for a start duration, one for a middle duration, and one for an end duration. Such sensor data patterns are compared by the temporal characteristics analyzer 226 against one or more reference patterns. In the event a particular one of the reference patterns matches within a particular standard deviation, then the process may be deemed satisfactory for that particular time window. In some examples, the temporal characteristics analyzer 226 identifies a temporal pattern of the sensor value occurrences during the period of time leading up to the detection of the excursion. Stated differently, while the example sensor characteristics analyzer 224 identifies particular sensor types and their corresponding values that occur leading up to the excursion, the example temporal characteristics analyzer 226 detects patterns related to how frequently such sensor types and/or values occur per unit of time.

As described above, the generated fingerprints are used by the example classification manager 212 to perform one or more classification operation(s), thereby determining whether the fingerprint is associated with a previously-identified fingerprint. Also as described above, in the event the fingerprint has not previously been classified, the example fingerprint manager 220 updates the fingerprint excursion database 214. In particular, the example node interfacer 216 transmits the classified fingerprint to other manufacturing cells (process control nodes). The example fingerprint manager 220 invokes the example timer 228 to start a response timer, and the node interfacer 216 determines whether an acknowledgement has been received from each manufacturing cell. Generally speaking, because process control systems may include any number of manufacturing stations in which each station operates on a part/product, proper coordination between each station is important to prevent material waste and product defects. As such, the example timer 228 is started to ensure that the newly classified fingerprint is shared among all participating manufacturing cells before subsequent cells can operate on the part to prevent an operational disparity of the overall process control system.

If the example node interfacer 216 does not detect an acknowledgement, the timer 228 determines if a threshold amount of time has expired. In some examples, the threshold amount of time is a duration that is expected for one of the manufacturing cells to complete one iteration of tasks on the part. If the timer 228 has not expired, then the node interfacer 216 continues to monitor for indications of acknowledgement from the other manufacturing cells of the process control system. However, in response to the example node interfacer 216 detecting an acknowledgement, the node interfacer 216 increments a counter and determines if the count value is equal to a number of expected manufacturing cells in the process control system. In other words, the example node interfacer 216 determines whether all of the process nodes of the process control system have successfully received the classified fingerprint.

If not, the example timer 228 determines if the time has expired and, if not, continues to wait and monitor for additional acknowledgement signals. At any circumstance in which the timer 228 expires, the example node interfacer 216 sends rollback messages to all the manufacturing cells/nodes to disregard the classified fingerprint. This is done to prevent a disparity in operation among the different manufacturing cells in the process control system. However, in the event the node interfacer 216 determines that all manufacturing cells have acknowledged receipt of the classified fingerprint, then the example fingerprint manager 220 commits the classified fingerprint to a local knowledgebase, such as the example fingerprint excursion database 214.

In circumstances where the example fingerprint manager 220 determines that a classified fingerprint has been identified and/or otherwise occurred on a prior occasion (e.g., indicative of this particular excursion occurring on a prior occasion), the example classification manager 212 determines context information associated with the excursion. In particular, the example node interfacer 216 generates a query message using the fingerprint and sends the same to any available manufacturing cells. The example timer 228 is started and the node interfacer 216 determines which particular manufacturing cells respond to the query message with an indication that (a) the fingerprint has been detected at the particular manufacturing cell or (b) the fingerprint has not been detected at the particular manufacturing cell. In some examples, the node interfacer 216 receives and/or otherwise retrieves a count of such fingerprint occurrences from the respective manufacturing cells. In other words, the example node interfacer 216 determines a number of workstations of the process control system that exhibit the fingerprint.

The example node interfacer 216 monitors the manufacturing cells during a threshold amount of time or until all known cells have reported back a response from the query. The example node interfacer 216 updates a count regarding how many cells exhibit this same fingerprint behavior and the example excursion statistics calculator 218 calculates excursion statistics. In some examples, two or more manufacturing cells (nodes) operate as a toolset, in which the combination of processing operations on a part ultimately result in the finished product. The example excursion statistics calculator 218 calculates the excursion statistics to identify different types of circumstances that allow improved process behavior, such as indications that one or more stations require tool maintenance, or whether a quality metric of incoming raw material is degrading. In still other examples, the excursion statistics calculator 218 identifies circumstances where ambient and/or environmental conditions are deemed to be responsible for output/quality changes that deviate from the digital twin. In some examples, the excursion statistics calculator 218 invokes one or more corrective actions for respective ones of the number of workstations, in which the particular corrective actions are based on a threshold count of the number of workstations that experience and/or otherwise exhibit behaviors similar to the detected fingerprint.

In still other examples, the excursion statistics calculator 218 determines a weighted time factor for mean time between failure (MTBF) for respective excursions and particular tools within the toolset (e.g., respective tools within each particular manufacturing cell). The example excursion statistics calculator 218 determines a toolset (station-set) entropy metric based on the MTBF, and determines a tool/toolset health index based on the MTBF. As used herein, entropy is a measure of instability in a particular toolset and, in some examples, determined based on a count of output excursion incidents. In some examples, the entropy is determined and/or otherwise plotted as a function of time such that a derivative may be determined by the example excursion statistics calculator 218. As such, the example excursion statistics calculator 218 calculates a rate of change to determine a corresponding stability of each tool within a toolset (e.g., at particular intervals). In some examples, the excursion statistics calculator 218 determines cumulative toolset entropy metrics as an average of the rate of change for each particular participating tool. Because examples disclosed herein generate excursion fingerprints, classify such fingerprints, and share such fingerprints among any number of participating manufacturing cells, excursions are identified in a relatively fast manner when compared to traditional process control techniques. Additionally, because examples disclosed herein calculate and/or otherwise determine excursion trending on both a cell by cell basis and on the toolset as a whole, process error can be corrected before production errors become too severe and/or before manufacturing resources (e.g., raw materials) are wasted.

While examples disclosed above include excursion detection, fingerprinting and classification, examples below enable dynamic adjustments of downstream process operations in connection with process variability in upstream process activities. In some examples, variability is caused by source material (e.g., raw material) changes, such as dimensional, chemical, electrical and/or structural deviations to raw materials when compared to expected dimensional, chemical, electrical and/or structural metrics. Typical control system operations do not consider variation of the incoming source material and, instead, typically focus on maintaining predefined set points with proportional-integral-derivative (PID) or model-based control. However, such approaches suffer from a "one size fits all" constraint with a focus on stability of process steps rather than consideration of adjustments to the recipe/control process. Examples disclosed herein encapsulate variations to the control process with the aid of digital twin data that is shared upstream and downstream to any particular manufacturing cell. As such, the digital twin data permits dynamic adjustment of process configurations prior to execution of manufacturing cell tools on physical components and/or raw materials, thereby reducing waste and improving process control cycle time.

Process Adjustment Analyzer

Figure 3:
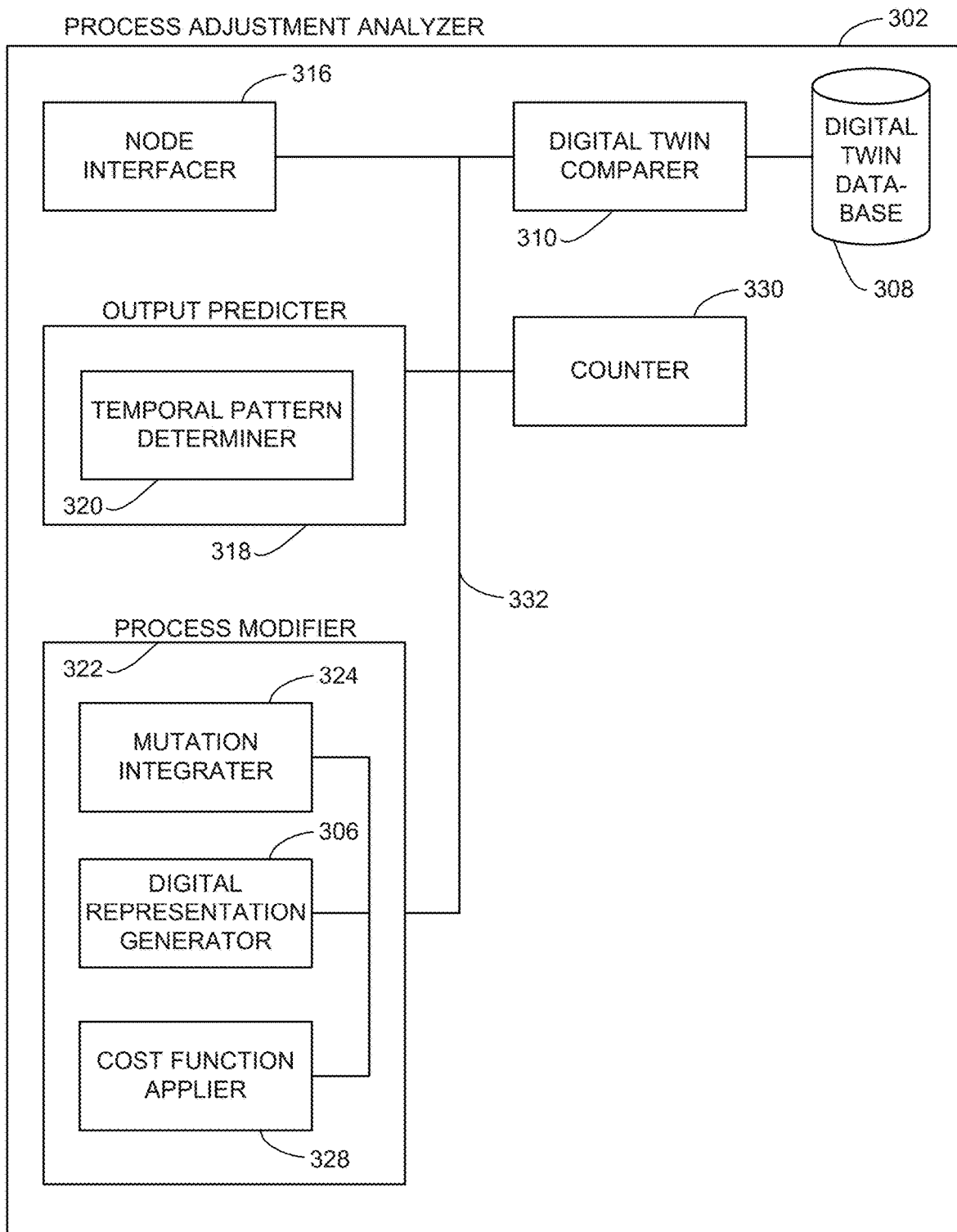
FIG. 3 is a schematic illustration of an example process adjustment analyzer to manage process excursions in accordance with teachings of this disclosure.

FIG. 3 is a schematic illustration of an example process adjustment analyzer 302 to manage process excursions (e.g., in a process control system). The example process adjustment analyzer 302 is part of the example node 120 of a manufacturing cell as shown in FIG. 1 (e.g., the example first manufacturing cell 102). However, the example process adjustment analyzer 302 may, alternatively, operate as stand-alone structure external to the example edge node 120. In the illustrated example of FIG. 3, the process adjustment analyzer 302 includes a node interfacer 316, which is similar to the example node interfacer 216 of FIG. 2. The example process adjustment analyzer 302 also includes an example digital twin comparer 310 communicatively connected to an example digital twin database 308, each of which are similar to the example digital twin comparer 210 and the example digital twin database 208 of FIG. 2, respectively. The example process adjustment analyzer 302 also includes an example output predictor 318 and an example temporal pattern determiner 320. The example process adjustment analyzer 302 also includes an example process modifier 322, which includes an example mutation integrator 324, an example digital representation generator 306 (which is similar to the example digital representation generator 206 of FIG. 2), and an example cost function applier 328. The example process adjustment analyzer 302 also includes an example counter 330, and the aforementioned structure of FIG. 3 is communicatively connected (and/or interconnected) by an example process adjustment bus 332.

In operation, the example node interfacer 316 retrieves a digital representation from an upstream process (e.g., a process that temporally precedes a current manufacturing cell). As described above, the example digital representation generator 206 of FIG. 2 calculates a digital representation of the product (or partially completed product) of interest. In some examples, the example digital representation generator 306 of FIG. 3 calculates the digital representation of the product in the event it had not been generated at a prior manufacturing stage.

The example output predictor 318 predicts a product output analysis based on the digital representation of the product. In particular, because the predicted output is based on the digital representation, raw materials and/or the actual product itself do not need to be modified (e.g., material waste is prevented) by tools associated with the current manufacturing stage until after the output analysis is complete. As a result, the raw materials and/or products that are partially manufactured are not further modified and/or otherwise processed until the output analysis reveals an indication that the current manufacturing stage, when executed, will result in a product that meets expected design constraints (e.g., meet dimensional, chemical, electrical, functional, etc., requirements).

To predict the product output, the example output predictor 318 invokes the example temporal pattern determiner 320 to identify a short-term process pattern ($t_1$). Generally speaking, the example output predictor 318 determines one or more metrics (e.g., process data sets) that correspond to process stability by identifying and/or otherwise analyzing both the short-term process pattern ($t_1$) (e.g., an empirically determined window of time or number of previous manufacturing process iterations) and a long-term process pattern ($t_2$) (e.g., a window of time or number of previous manufacturing process iterations that are relatively greater than the short-term duration/quantity) for indications of stability (or lack thereof). In some examples, the short-term process pattern ($t_1$) includes a threshold number of iterations (e.g., 25 previous iterations) and the long-term process pattern ($t_2$) includes a threshold number of iterations (e.g., 100 previous iterations). In still other examples, the short-term and long-term process patterns are evaluated in connection with a percentage quantity of previous iterations (e.g., 25% of the previous iterations for the short-term process pattern ($t_1$) and 75% of the previous iterations for the long-term process pattern ($t_2$)). Generally speaking, the output predictor 318 analysis of the short-term and long-term process patterns provides an indication of a degree of stability of a process of interest (e.g., an indication of the difference between an expected outcome and an actual outcome). For instance, in the event an expectation of 0.01 mm etch on a surface of a part is met with an actual observation of 0.015 mm, then a value of 0.005 is recorded by the example output predictor 318 such that variations from this difference value can be monitored (tracked) over time, thereby providing an indication of a degree of stability over different periods of interest (e.g., short-term, long-term). The patterns are compared by the example temporal pattern determiner 320 for a match. In some examples, the digital twin database 308 includes candidate trends of data that can be compared-to for matches. Certain trending behaviors are indicative of particular deviations, failures and/or indications of a need for maintenance or preventative maintenance. Stated differently, the trends can be categorized. Such trending data includes labelled data that is particularly useful when invoking machine learning tools for categorization purposes. In some examples, an absolute difference technique/measurement is employed to determine which sample trend in a data set (trending behavior) of interest reflects the observed data most accurately.

If the patterns match (e.g., if the short-term process pattern $t_1$ matches the long-term process pattern $t_2$), then the example temporal pattern determiner 320 generates a product prediction based on (a) the current (e.g., default) process configuration and (b) the long-term process pattern ($t_2$) using machine learning. Generally speaking, when the patterns match, this is an indication that the current (e.g., default) process configuration is adequate and not in need of any modification (e.g., mutation). On the other hand, in the event the patterns do not match (e.g., if the short-term process pattern $t_1$ deviates from the long-term process pattern $t_2$ by a threshold amount/value), this is an indication that changes to the incoming product are pervasive, thereby rendering the current process configuration obsolete. Accordingly, the example temporal pattern determiner 320 evaluates the patterns in an effort to determine whether the process configuration should change. In some cases, regression analysis is employed by the example temporal pattern determiner 320 to incorporate information and consider different correlations in this decision-making process. Deviations between the short-term process patterns and the long-term process patterns are sometimes referred-to herein as mutations.

In such circumstances where the example temporal pattern determiner 320 determines that the short-term and long-term process patterns do not match, the example process modifier 322 modifies the current process configuration. In particular, the example mutation integrator 324 merges the detected mutations with the current process configuration to create a mutated process configuration. As used herein, merging is replacing current values with the detected mutated values. The example digital representation generator 306 translates the mutated process configuration into a mathematical representation, sometimes referred to herein as a hypothesis function. The hypothesis function represents the "mutated" process configuration. In some examples, the digital representation generator 306 generates any number of hypothesis functions, each of which describing a particular aspect of the process and/or process configuration. The example cost function applier 328 retrieves a candidate cost function (e.g., from a data store having information related to incoming product specifications) and minimizes the cost function by mutation alterations of the example hypothesis function. The example cost function applier 328 may perform minimization by, for example, application of a gradient descent, as described in further detail in a manner consistent with example Equation 2. In some examples, the cost function applier 328 applies the cost function in a manner consistent with example Equation 1.

$$J(\theta)=(\text{hypothesized}-\text{Prev\_Output})^2 \qquad \text{Equation 1.}$$

In the illustrated example of Equation 1, $J(\theta)$ represents the cost function as a difference between output of a hypothesis function and a previous output, in which hypothesized represents a mathematical representation of the expected output that will be produced by the current manufacturing cell, and Prev_Output represents a mathematical representation of the previous output by the current manufacturing cell.

The example cost function applier 328 determines whether the minimized cost function value is less than a threshold value. If so, then the current configuration of the process (e.g., "recipe") is deemed sufficient and not in need of modification. However, if not, then the example digital representation generator 306 applies one or more revisions to the hypothesis function. In some examples, modifications to the hypothesis function are realized by application of a gradient descent algorithm in a manner consistent with example Equation 2.

$$\theta_j := \theta_j - \frac{\alpha\delta}{\delta\theta_j}J(\theta). \qquad \text{Equation 2}$$

In the illustrated example of Equation 2, $J(\theta)$ represents a cost function (e.g., the cost function of example Equation 1), $\theta_j$ represents the $j^{th}$ parameter of the hypothesis function, and $\alpha$ represents a step size, which determines a rate at which example Equation 2 will converge. Additionally, $$\frac{\delta}{\delta\theta_j}J(\theta)$$

represents the partial derivative of the cost function with respect to the $j^{th}$ parameter. In some examples, the digital representation generator 306 iteratively alters the value of the $j^{th}$ parameter ($\theta_j$) on all values of j in a substantially simultaneous manner. The modifications to the hypothesis function serve as the basis for modifications to the current process in an effort to improve process performance when faced with variations to input anomalies (e.g., input raw material variations that do not satisfy expected tolerance values). Generally speaking, a gradient descent algorithm, such as that shown in example Equation 2, takes steps of a particular size to reach a global optimum of a cost function, such as the example cost function of example Equation 1. The global optimum is a representation of where a particular metric of interest has been optimized.

Now that a new process has been established through one or more mutations, the example output predictor 318 generates an updated product prediction for the current manufacturing cell. In some examples, the output predictor 318 employs one or more machine learning algorithms to assist in the updated prediction. For instance, the example output predictor 318 applies regression techniques to fit the model to data points (observations). The example digital twin comparer 310 determines whether the updated prediction is within threshold tolerance values of the digital twin and, if so, the example process adjustment analyzer 302 executes the process step(s) for the current manufacturing cell on the raw materials (or partially processed product that is progressing through the overall process control system having any number of manufacturing cells).

The example digital representation generator 306 calculates a digital representation of the recently operated-on product in a manner similar to that discussed above. That is, data from the example sensor interfacer 204 (e.g., multimodal cameras, weight sensors, smoothness detectors, etc.) is used by the example digital representation generator 306 to calculate and/or otherwise generate a digital representation of the product of interest. The example digital twin comparer 310 determines differences between the digital representation and the predicted representation and verifies whether one or more tolerance values are met. If not, then the example counter 330 increments a count value. In other words, when efforts to modify the current process still fail to satisfy tolerance values, then this is an indication that further process control modification is needed. However, to avoid overzealous adjustment of the process control modification, such further modifications only occur after a threshold counter limit is detected. When that limit is detected, the example mutation integrator 324 applies further mutations, as described in further detail below. The example mutation integrator 324 identifies the most altered variables from the hypothesis function (e.g., calculated differences between mutated values and prior unmutated values) and applies mutation adjustment values thereto. In some examples, further mutation of the identified most altered variables is achieved by generating a random value between a highest and lowest variable value in the hypothesis function, and then resetting that variable with the newly-generated random value.

While an example manner of implementing the excursion manager 202 of FIG. 2 is illustrated in FIGS. 1 and 2 and an example manner of implementing the process adjustment analyzer 302 of FIG. 3 is illustrated in FIGS. 1 and 3, one or more of the elements, processes and/or devices illustrated in FIGS. 1-3 may be combined, divided, re-arranged, omitted, eliminated and/or implemented in any other way. Further, the example sensor interfacer 204, the example digital representation generator 206, the example digital twin comparer 210, the example classification manager 212, the example node interfacer 216, the example excursion statistics calculator 218, the example fingerprint manager 220, the example weight manager 222, the example sensor characteristics analyzer 224, the example temporal characteristics analyzer 226, the example timer 228, the example digital twin database 208, the example fingerprint excursion database 214 and/or, more generally, the example excursion manager 202 of FIG. 2 may be implemented by hardware, software, firmware and any combination of hardware, software and/or firmware. Additionally, the example node interfacer 316, the example digital twin comparer 310, the example output predictor 318, the example temporal pattern determiner 320, the example counter 330, the example process modifier 322, the example mutation integrator 324, the example digital representation generator 306, the example cost function applier 328, the example digital twin database 308 and/or, more generally, the example process adjustment analyzer 302 of FIG. 3 may be implemented by hardware, software, firmware and/or any combination of hardware, software and/or firmware. Thus, for example, any of the example sensor interfacer 204, the example digital representation generator 206, the example digital twin comparer 210, the example classification manager 212, the example node interfacer 216, the example excursion statistics calculator 218, the example fingerprint manager 220, the example weight manager 222, the example sensor characteristics analyzer 224, the example temporal characteristics analyzer 226, the example timer 228, the example digital twin database 208, the example fingerprint excursion database 214 and/or, more generally, the example excursion manager 202 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). Furthermore, any of the example node interfacer 316, the example digital twin comparer 310, the example output predictor 318, the example temporal pattern determiner 320, the example counter 330, the example process modifier 322, the example mutation integrator 324, the example digital representation generator 306, the example cost function applier 328, the example digital twin database 308 and/or, more generally, the example process adjustment analyzer 302 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interfacer 204, the example digital representation generator 206, the example digital twin comparer 210, the example classification manager 212, the example node interfacer 216, the example excursion statistics calculator 218, the example fingerprint manager 220, the example weight manager 222, the example sensor characteristics analyzer 224, the example temporal characteristics analyzer 226, the example timer 228, the example digital twin database 208, the example fingerprint excursion database 214 and/or, more generally, the example excursion manager 202 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Additionally, When reading any of the apparatus or system claims of this patent to cover a purely software and/or firmware implementation, at least one of the example node interfacer 316, the example digital twin comparer 310, the example output predictor 318, the example temporal pattern determiner 320, the example counter 330, the example process modifier 322, the example mutation integrator 324, the example digital representation generator 306, the example cost function applier 328, the example digital twin database 308 and/or, more generally, the example process adjustment analyzer 302 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example excursion manager 202 of FIG. 2 and/or the example process adjustment analyzer 302 of FIG. 3 may include one or more elements, processes and/or devices in addition to, or instead of, those illustrated in FIGS. 1-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example excursion manager 202 of FIG. 2 and the example process adjustment analyzer 302 of FIG. 3 are shown in FIGS. 4-12. The machine readable instructions may be one or more executable programs or portion(s) of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 4-12, many other methods of implementing the example excursion manager 202 and the example process adjustment analyzer 302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 4:
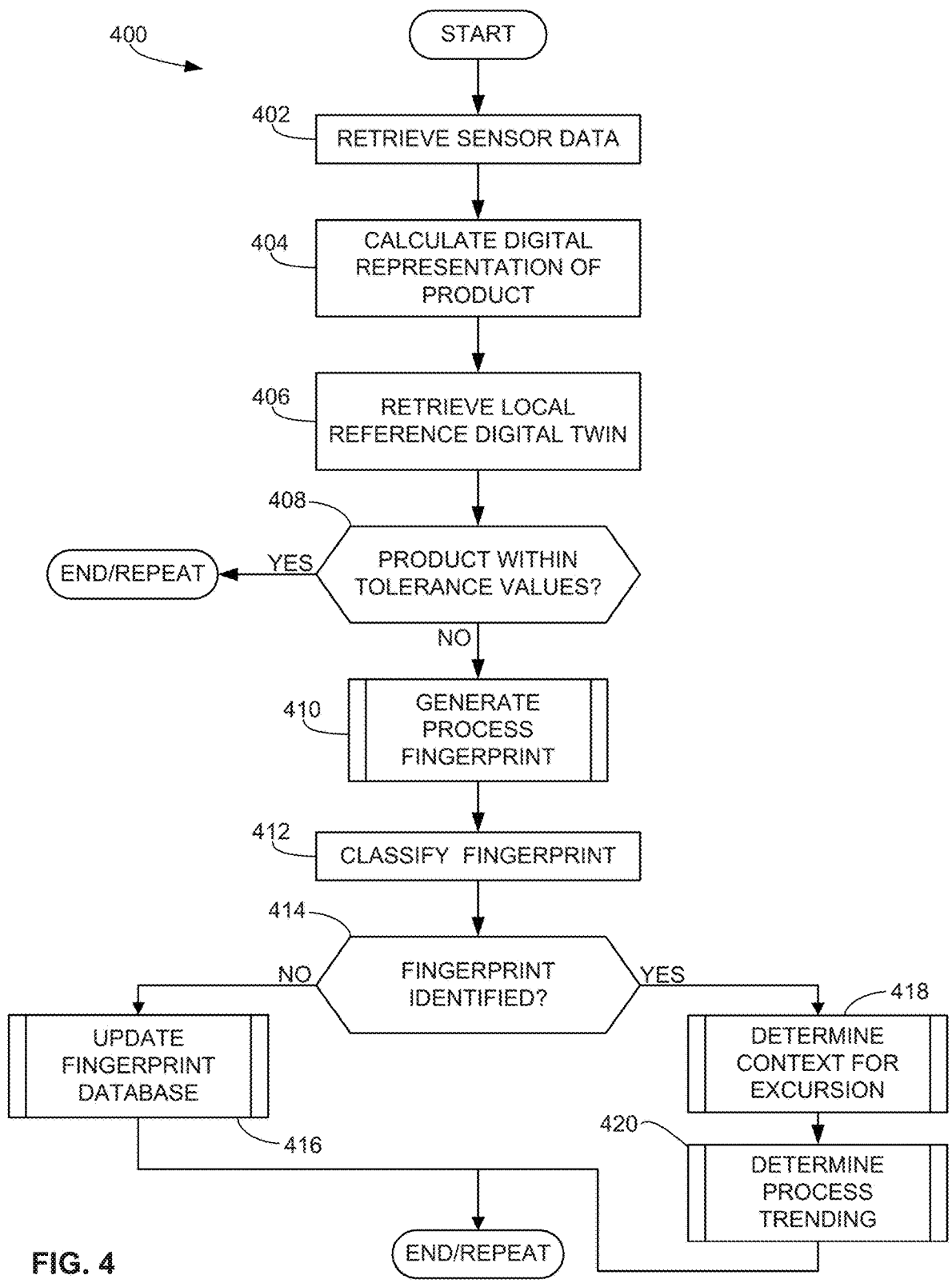
FIGS. 4-8 are flowcharts representative of example machine readable instructions which may be executed to implement the example excursion manager of FIG. 2 to manage process excursions.

The program 400 of FIG. 4 includes block 402, in which the example sensor interfacer 204 retrieves and/or otherwise receives sensor data from a manufacturing cell, such as the example first manufacturing cell 102 of FIG. 1. The example digital representation generator 206 calculates a digital representation of the product of interest (block 404), and the example digital twin comparer 210 retrieves a digital twin (block 406) (e.g., retrieved from the example digital twin database 208). The example digital twin comparer 210 determines whether the product of interest is within one or more tolerance values (block 408) and, if so, then the example manufacturing cell 102 is deemed to be operating correctly (e.g., no excursions). In some examples, the program 400 of FIG. 4 ends, and in some examples the program 400 of FIG. 4 returns to block 402 to analyze another iteration of manufacturing cell 102 operation.

Figure 5:
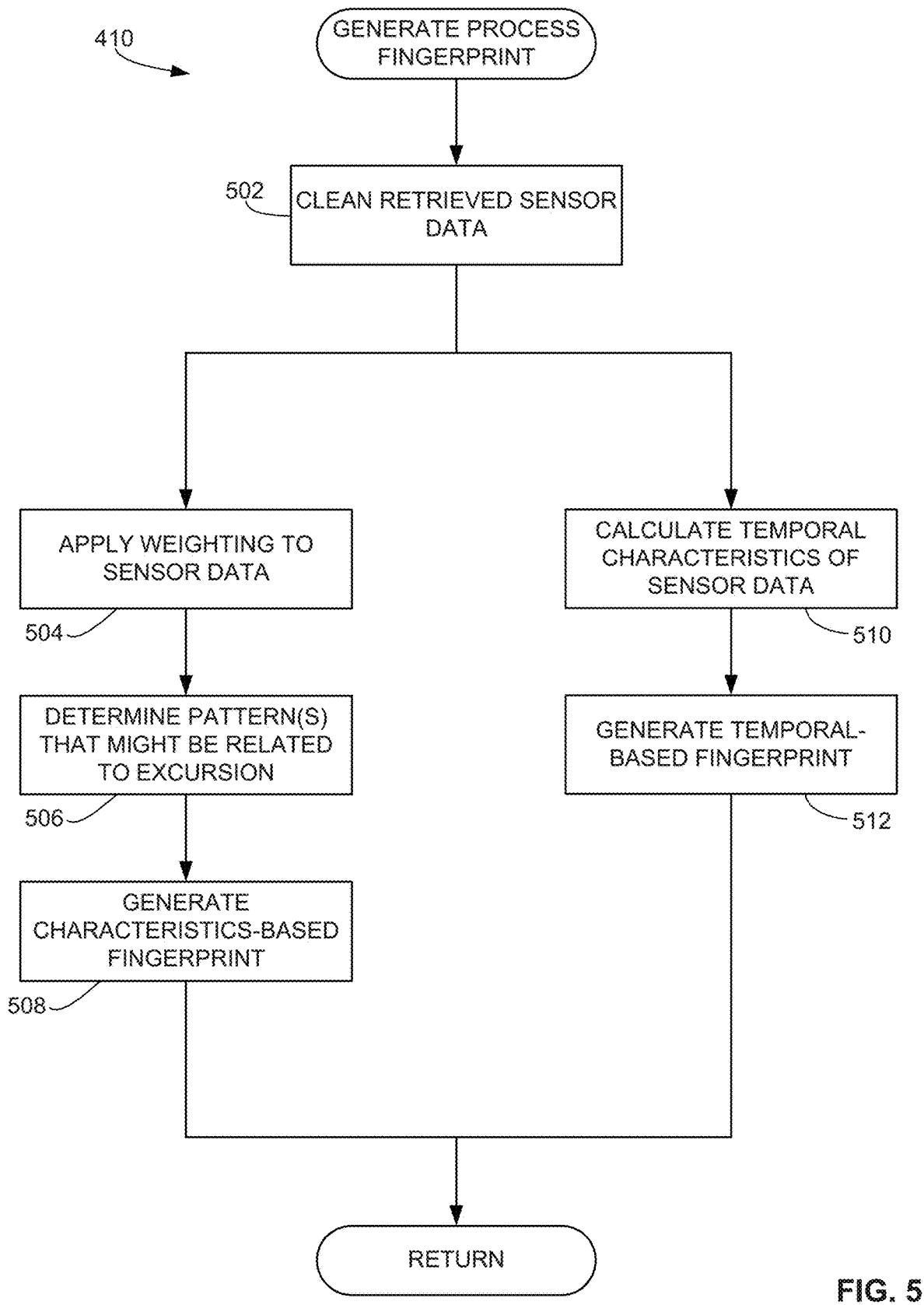

In the event the digital twin comparer 210 determines that one or more tolerance values are not satisfied (block 408) (e.g., dimensional violations (e.g., values that exceed a threshold target, values that are below a threshold target) when compared to the digital twin), the example fingerprint manager 220 generates a process fingerprint (block 410). FIG. 5 illustrates additional detail associated with generating the process fingerprint of block 410. In the illustrated example of FIG. 5, the example sensor interfacer 204 cleans retrieved sensor data (block 502). In particular, the example fingerprint manager 220 generates two types of fingerprints, one of which considers sensor patterns (e.g., sensor data types, sensor data values/thresholds, etc.), and another of which considers temporal characteristics of the sensor data (e.g., frequency with which a particular sensor type exhibits a particular value). The example weight manager 222 applies weighting values to the sensor data (block 504), and the example sensor characteristics analyzer 224 determines one or more patterns that might be related to the excursion (block 506). With this information, the example fingerprint manager 220 generates a characteristic-based fingerprint (block 508) to aid in a classification attempt. Additionally, the example temporal characteristics analyzer 226 calculates and/or otherwise determines temporal characteristics of the retrieved sensor data (block 510), and the example fingerprint manager 220 generates a temporal-based fingerprint (block 512) to aid in the classification attempt.

Returning to the illustrated example of FIG. 4, the example classification manager 212 classifies the generated fingerprints (block 412). In some examples, the classification manager 212 queries the example fingerprint excursion database 214 to find a match of the generated fingerprints. In the event the example fingerprint manager 220 does not find a match for the generated fingerprints (block 414), then such fingerprints are deemed new and might be helpful for future anomaly/excursion detection efforts. The example fingerprint manager 220 updates the example fingerprint excursion database 214 with the newly identified fingerprints (block 416).

Figure 6:
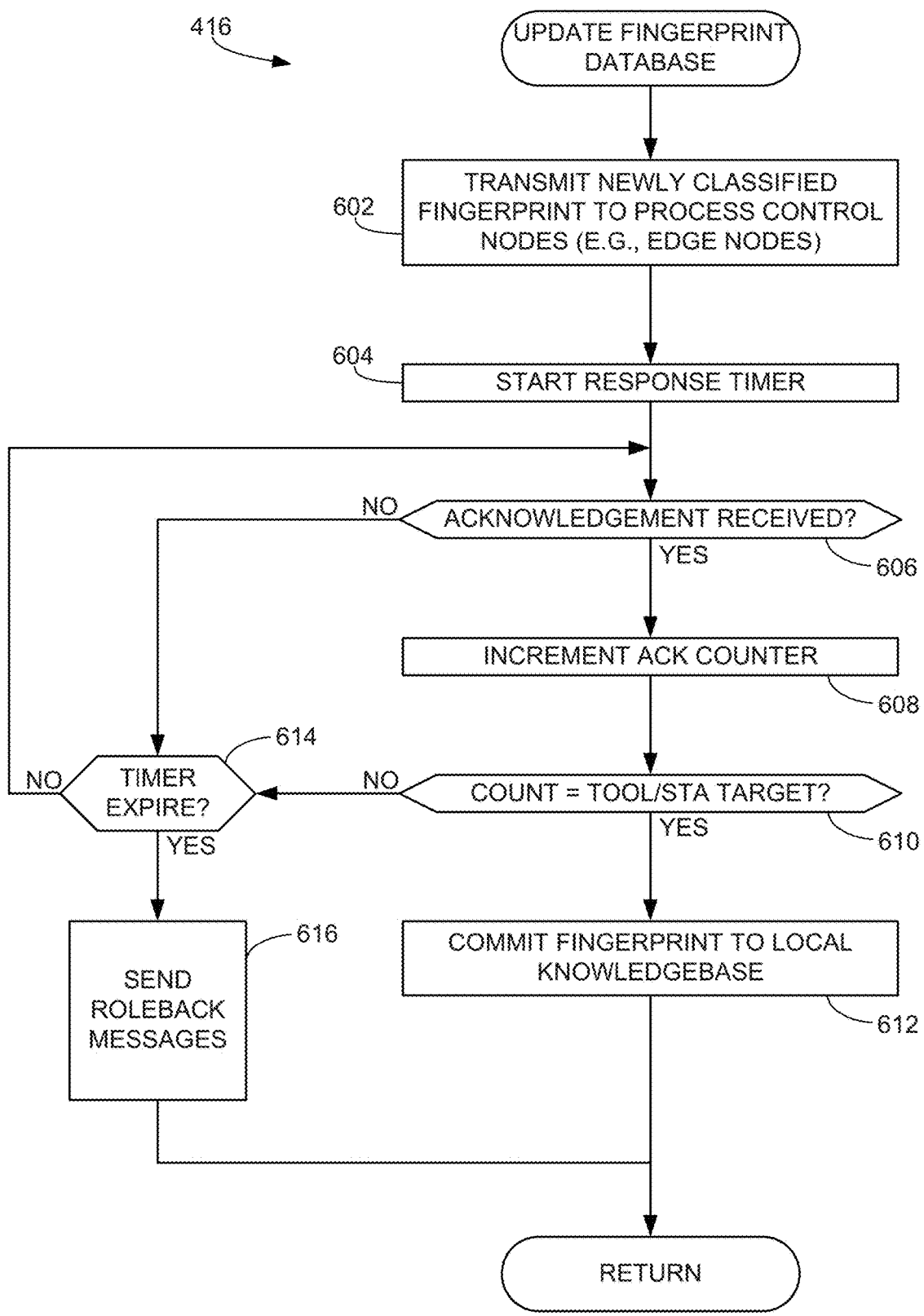

FIG. 6 illustrates additional detail associated with updating the fingerprint excursion database of block 416. In the illustrated example of FIG. 6, the example node interfacer 216 transmits the newly classified fingerprints to communicatively connected process control nodes (block 602). Example communicatively connected process control nodes include, but are not limited to respective edge nodes (e.g., the example edge node 120 of FIG. 1) corresponding to any number of manufacturing cells (e.g., the example first manufacturing cell 102 of FIG. 1). The example timer 228 is started (block 604) (e.g., started at the request of the example node interfacer 216), and the node interfacer 216 determines whether an acknowledgement of receipt of the fingerprints has been received (block 606). If so, the example node interfacer 216 increments an acknowledgement counter or count value (block 608) and determines whether the count value is equal to the number of known nodes, tools and/or manufacturing cells that make up a complete manufacturing system (block 610). If so, then the overall manufacturing system (e.g., a series of individual manufacturing cells that cooperate to manufacture an end product) has been fully informed of the new fingerprint such that each individual manufacturing cell is capable of identifying the same. The fingerprint manager 220 then commits the newly discovered fingerprints to a local knowledgebase (block 612), such as the example fingerprint excursion database 230.

In the event the example node interfacer 216 does not receive an acknowledgement (block 606), then the example timer 228 determines if a threshold duration has expired (block 614). In other words, a finite duration of time is allocated to the effort of communicating the newly discovered fingerprints to the overall manufacturing system so that it can operate in a consistent manner. Absent all participating manufacturing cells having the most-recent fingerprint information, then consistent system behavior is less likely to occur. Thus, if the timer expires (block 614) without all of the manufacturing cells acknowledging receipt of the fingerprints, then the example node interfacer 216 sends rollback messages to all of the previously acknowledged manufacturing stations (block 616) to prevent an information disparity of the overall process control system.

Figure 7:
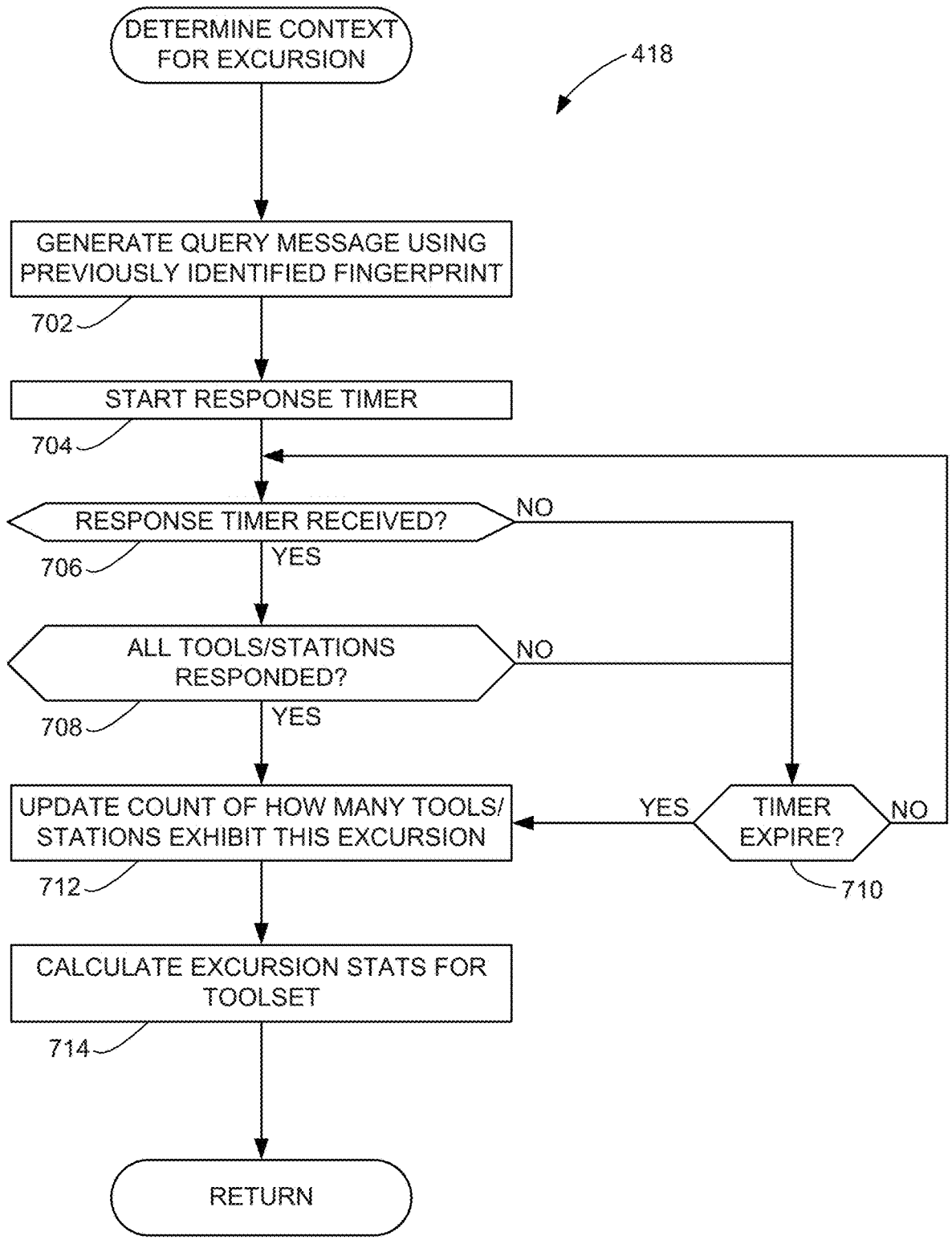

Returning to the illustrated example of FIG. 4, in the event a classified fingerprint is identified (block 414), then the example fingerprint manager 220 determines a context for the excursion (block 418). FIG. 7 illustrates additional detail associated with determining a content for the excursion of block 418. In the illustrated example of FIG. 7, the example node interfacer 216 generates a query message using the recently identified fingerprint (block 702). This query message is broadcast and/or otherwise distributed to all manufacturing cells that make up an overall process control system. The example timer 228 is started (block 704) (e.g., started by the example node interfacer 216), and the example node interfacer 216 determines whether a response message has been received (block 706). If not, the timer 228 determines whether a threshold duration has expired (block 710) and, if not, control returns to block 706 to look for instances of response messages.

For circumstances where a response message is received (block 706), the example node interfacer 216 determines whether all participating manufacturing cells of the process control system have responded (block 708). If not, then the timer 228 determines whether the threshold duration has expired (block 710). Again, if not then control returns to block 706. However, in the event the timer has expired (block 710) or all tools have responded (block 708), then the example node interfacer 216 updates a count of how many manufacturing cells, stations and/or tools therein exhibit the same excursion as was detected by the current manufacturing cell (block 712). The example excursion statistics calculator 218 uses such information to calculate excursion statistics for the tool sets and/or each individual tool within respective manufacturing cells (block 714). As described above and in further detail below, such context information is helpful when identifying one or more trending activities/conditions of the process control system and/or respective manufacturing cells therein. Control then returns to FIG. 4.

Figure 8:
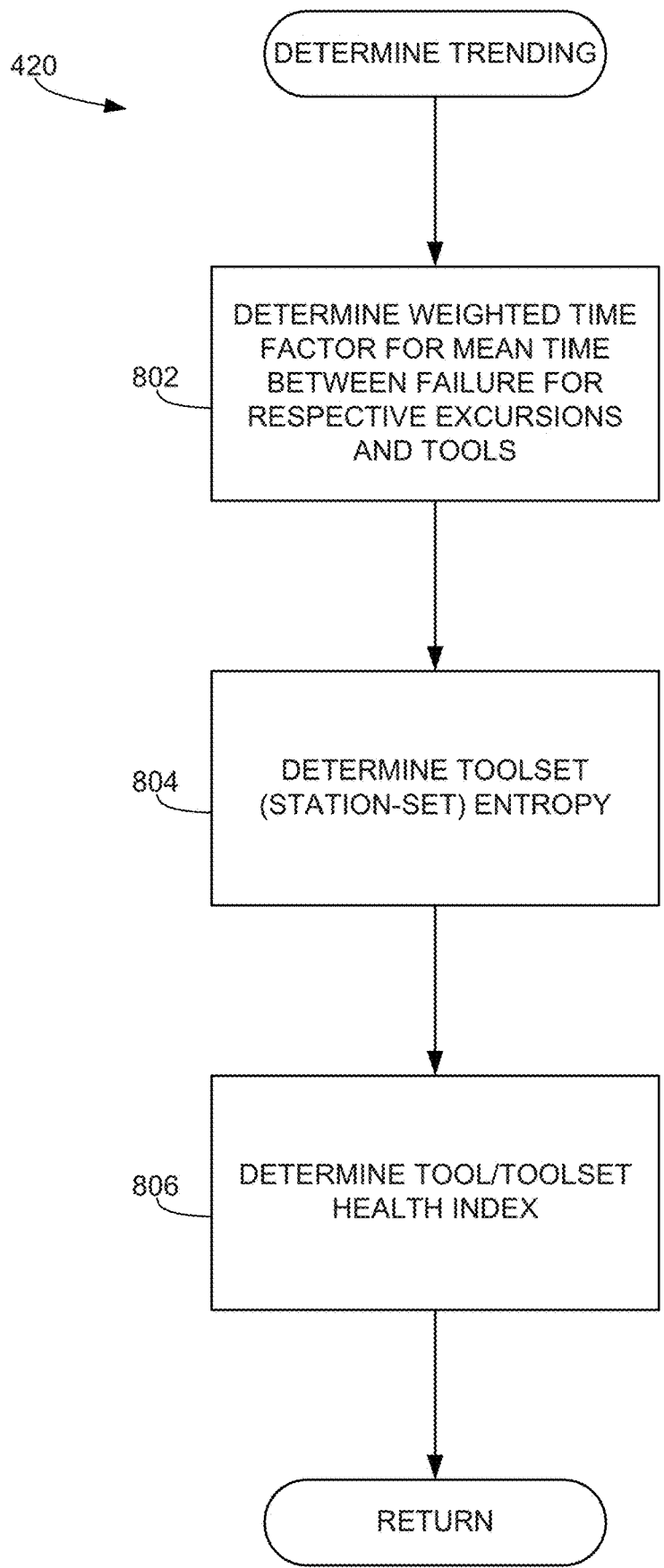

Returning to the illustrated example of FIG. 4, the example excursion statistics calculator 218 utilizes the different excursion statistics to identify and/or otherwise determine trending behaviors of the example process (block 420). FIG. 8 illustrates additional detail associated with determining process trending. In the illustrated example of FIG. 8, the excursion statistics calculator 218 determines a weighted time factor for the mean time between failure (MTBF) for respective excursion occurrences and associated tools (block 802). The example excursion statistics calculator 218 determines a toolset (station-set) entropy metric based on the MTBF (block 804), and determines a corresponding tool/toolset health index (block 806). Control then returns to FIG. 4 where the example program 400 ends or, in some examples, control returns to block 402 to analyze another iteration of process control by the manufacturing cell of interest.

While example flowcharts of FIGS. 4-8 above disclose example excursion detection, fingerprinting and classification in connection with the example excursion manager 202 of FIG. 2, example flowcharts below disclose example dynamic adjustments of downstream process operations in connection with the example process adjustment analyzer 302 of FIG. 3. The program 900 of FIG. 9 includes block 902, in which the example node interfacer 316 retrieves a digital representation from an upstream process, and the example output predictor 318 predicts a corresponding product output (block 904).

Figure 9:
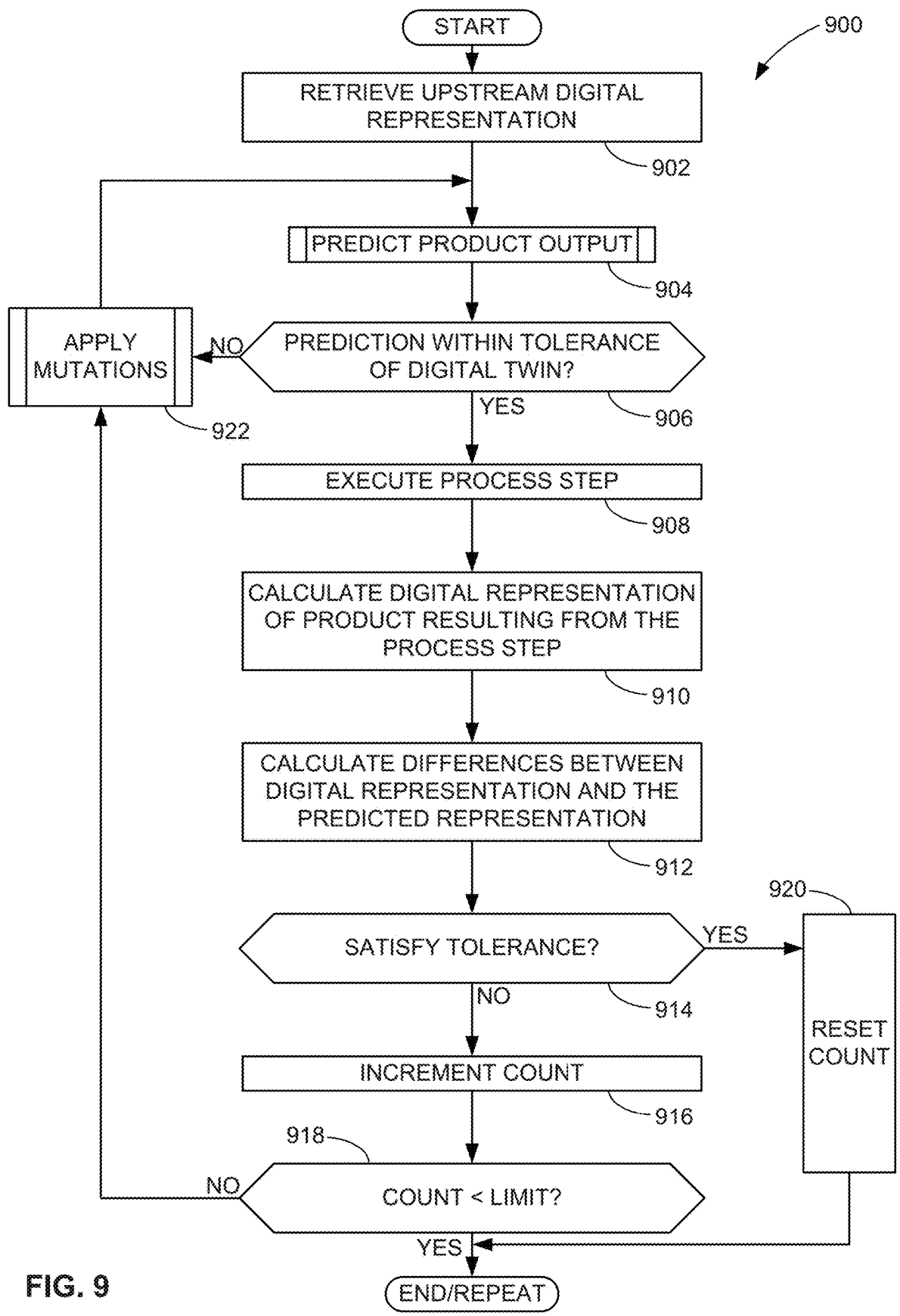
FIGS. 9-12 are flowcharts representative of example machine readable instructions which may be executed to implement the example process adjustment analyzer of FIG. 3 to manage process excursions.
Figure 10:
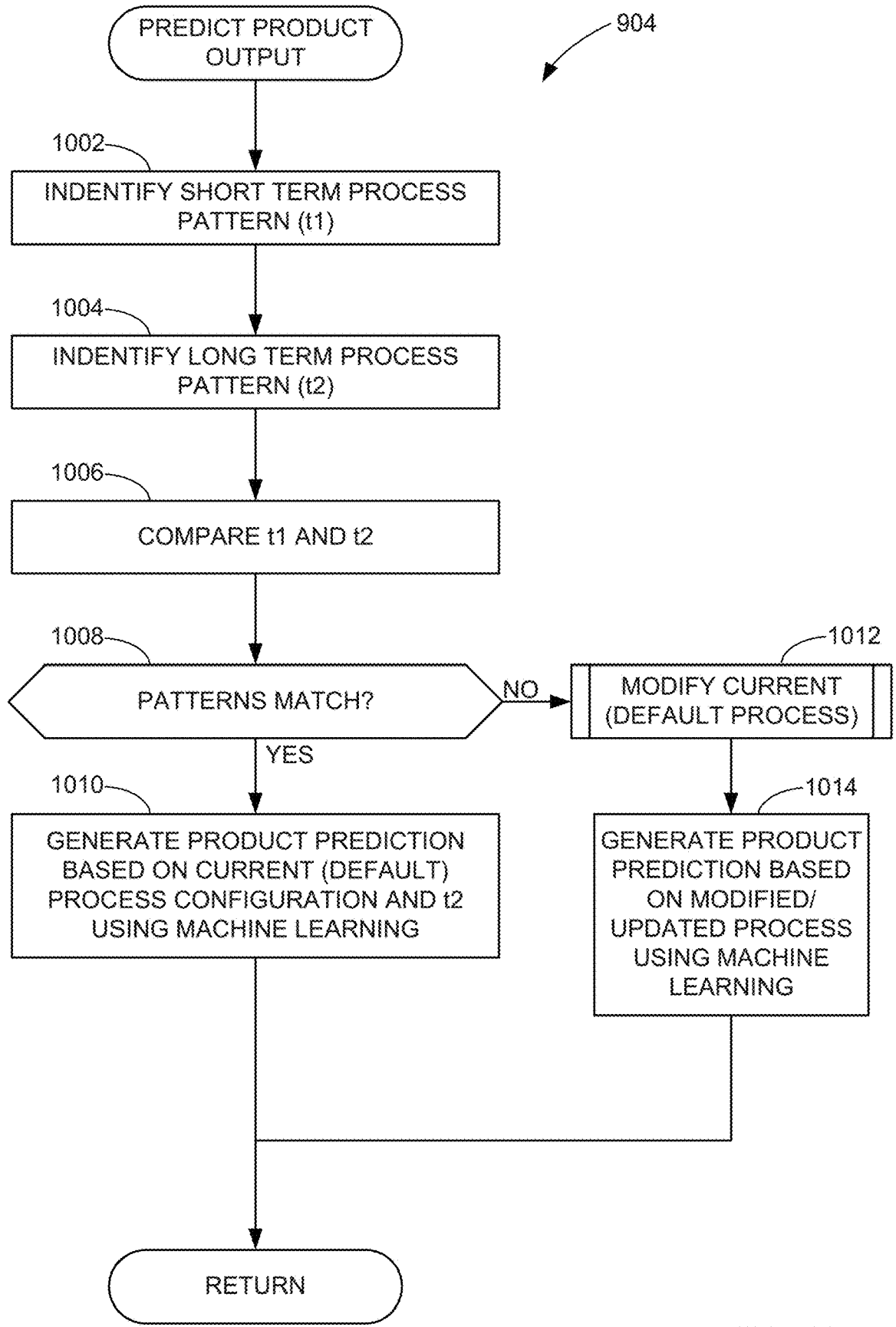

FIG. 10 illustrates additional detail corresponding to predicting a product output (block 904) of FIG. 9. In the illustrated example of FIG. 10, the example temporal pattern determiner 320 identifies a short-term process pattern ($t_1$) (block 1002). Additionally, the example temporal pattern determiner 320 identifies a long-term process pattern ($t_2$) (block 1004). The example temporal pattern determiner 320 compares the short-term pattern and the long-term pattern (block 1006) and determines whether those patterns match (block 1008). If so, then the example temporal pattern determiner 320 generates a product prediction based on (a) the current (e.g., the default process if not previously augmented) process configuration and (b) the long-term pattern using one or more machine learning techniques/tools (block 1010). Control then advances to block 906 of FIG. 9, as described above and in further detail below.

However, in the event the example temporal pattern determiner 320 determines that (a) the current process configuration and (b) the long-term pattern do not match (block 1008), then the example process modifier 322 modifies the current process configuration (block 1012). As described above, when the aforementioned patterns do not match, this is an indication that changes to the incoming product are pervasive and/or otherwise becoming a new-normal. As such, the current process configuration may be deemed obsolete.

Figure 11:
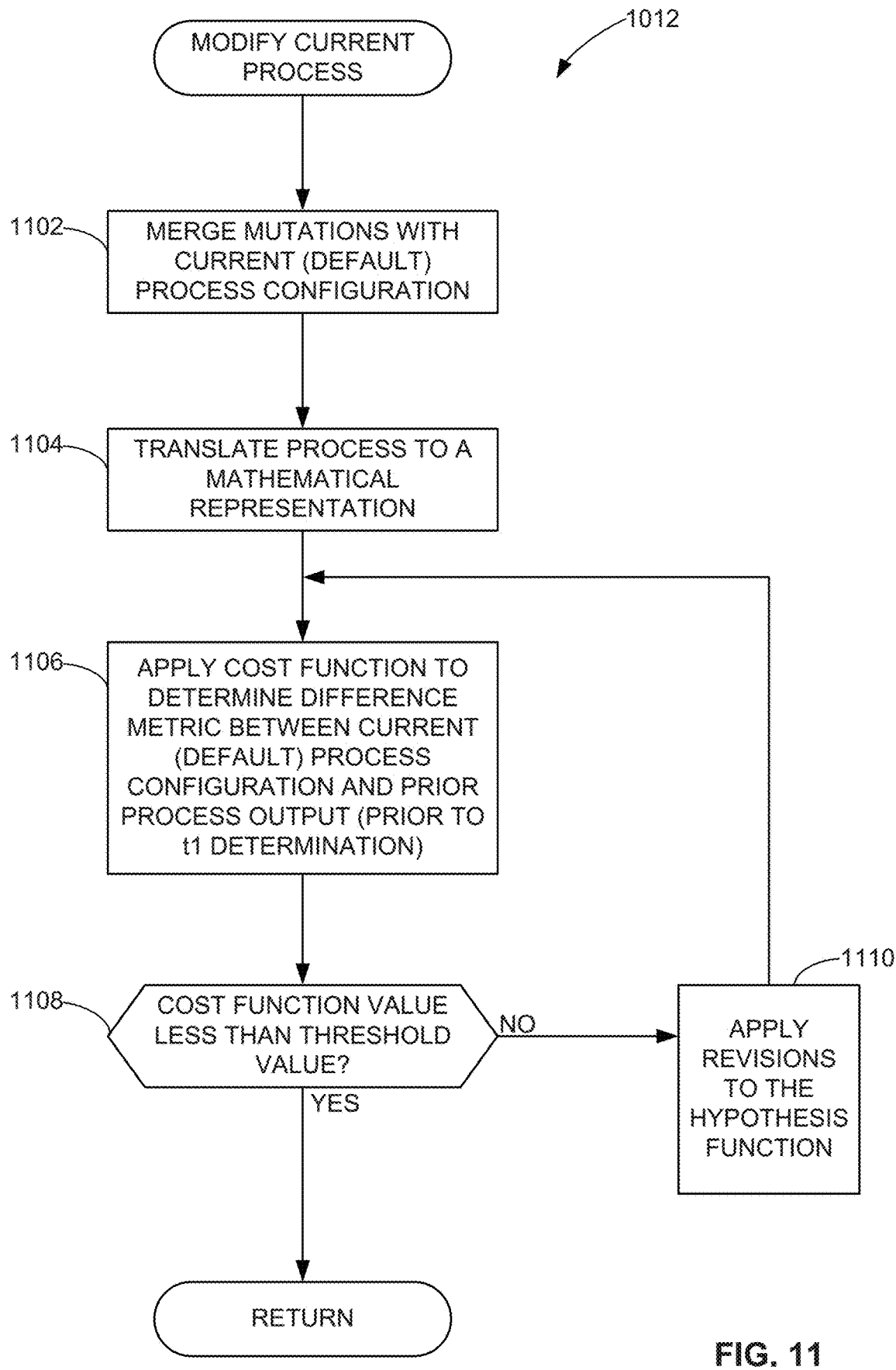

FIG. 11 illustrates additional detail corresponding to modifying the current process (block 1012). In the illustrated example of FIG. 11, the example mutation integrator 324 merges the detected mutations with the current process configuration to create a mutated process configuration (block 1102). The example digital representation generator 306 translates the mutated process configuration into a mathematical representation (block 1104), which is sometimes referred-to herein as a hypothesis function. The example cost function applier 328 retrieves a candidate cost function and minimizes the cost function by mutation alternations to the example hypothesis function (block 1106). In the event the example cost function applier 328 determines that the resulting cost function value is less than a threshold value (block 1108), then control of the example program of FIG. 11 returns to block 1014 of FIG. 10.

On the other hand, in the event the example cost function applier 328 determines that the resulting cost function value is not less than a threshold value (block 1108), then the example digital representation generator 306 applies revisions to the previously generated hypothesis function (block 1110), and control returns to block 1106. In other words, the example hypothesis function is further augmented until the example cost function output satisfies a particular threshold. Returning to the illustrated example of FIG. 10, the example output predictor 318 generates a product prediction based on the modified process using one or more machine learning techniques/tools (block 1014). Control then advances to block 906 of FIG. 9.

In the illustrated example of FIG. 9, the example digital twin comparer 310 determines whether the prediction is within one or more tolerance values of the digital twin (block 906). Again, such predictions occur without any need to modify and/or otherwise operate-on actual raw materials or parts, thereby reducing waste and processing time. The example process adjustment analyzer 302 executes the process step (block 908) (e.g., in connection with an updated process configuration) and, because the process step now operates on an actual real-world part or raw materials, the example digital representation generator 306 calculates a digital representation of the resulting process step (block 910). As described above, the example digital representation generator 306 may invoke and/or otherwise employ any number of sensors and/or cameras to generate the digital representation.

The example digital twin comparer 310 calculates differences between the digital representation and the predicted representation (block 912) and determines whether one or more tolerances are satisfied (block 914). If not, then the example counter 330 increments a count value (block 916). As described above, when efforts to (incrementally) modify the current process still fail to satisfy tolerance values, then this is an indication that further process control modifications may be needed. Of course, a single instance of threshold violations is not deemed sufficient for further modifications because doing so would result in an over-controlled system and adversely affect process control stability. Instead, the example counter 330 compares a current count value against a threshold value (block 918) and if the count does not exceed the limit, then no further modifications occur and the program 900 of FIG. 9 ends or reiterates in response to subsequent instances of process control activity.

Figure 12:
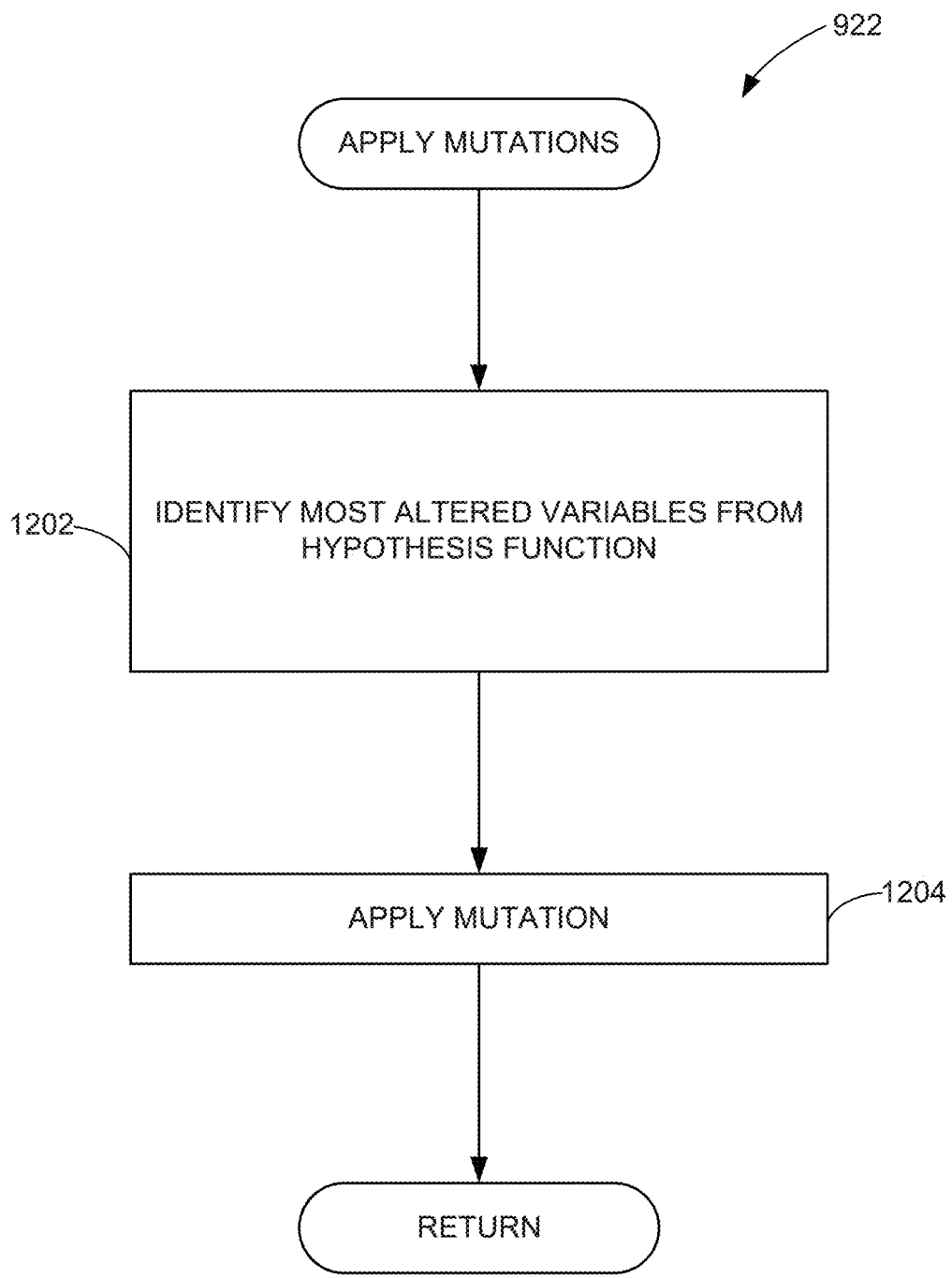

On the other hand, when the count value exceeds the threshold value (block 918), control advances to block 922 where the example mutation integrator 324 applies one or more mutations to the current process configuration (that may be deemed obsolete in view of the repeated occurrences of tolerance violation). FIG. 12 illustrates additional detail corresponding to the application of mutations of block 922. In the illustrated example of FIG. 12, the example mutation integrator 324 identifies the most altered variable from the hypothesis function (block 1202) and applies mutation adjustment values to those variable(s) (block 1204). Control then returns to FIG. 9.

Figure 13:
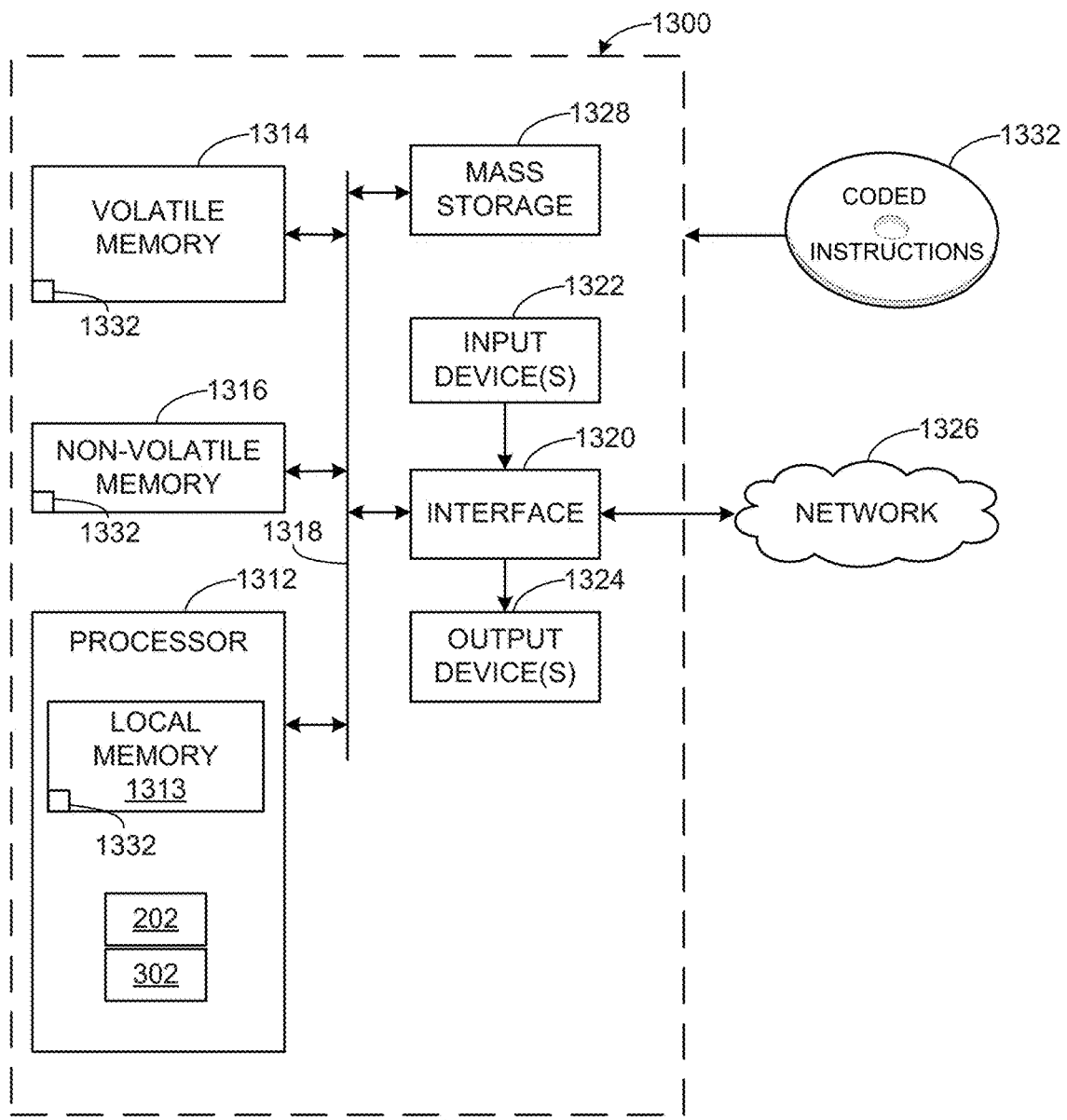
FIG. 13 is a block diagram of an example processing platform structured to execute the instructions of FIGS. 4-12 to implement the example CPS of FIG. 1, the example excursion manager of FIG. 2, and the example process adjustment analyzer of FIG. 3.

FIG. 13 is a block diagram of an example processor platform 1300 structured to execute the instructions of FIGS. 4-12 to implement the apparatus of FIGS. 1-3. The processor platform 1300 can be, for example, a server, a personal computer, a workstation, a self-learning machine (e.g., a neural network), an Internet appliance, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor interfacer 204, the example digital representation generator 206, the example digital twin comparer 210, the example classification manager 212, the example node interfacer 216, the example excursion statistics calculator 218, the example fingerprint manager 220, the example weight manager 222, the example sensor characteristics analyzer 224, the example temporal characteristics analyzer 226, the example timer 228, the example digital twin database 208, the example fingerprint excursion database 214 and/or, more generally, the example excursion manager 202 of FIG. 2. Additionally, in this example the processor 1012 implements the example node interfacer 316, the example digital twin comparer 310, the example output predictor 318, the example temporal pattern determiner 320, the example counter 330, the example process modifier 322, the example mutation integrator 324, the example digital representation generator 306, the example cost function applier 328, the example digital twin database 308 and/or, more generally, the example process adjustment analyzer 302 of FIG. 3.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIGS. 4-12 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed that facilitate communication between sub-processes of a process control system to allow detection of excursions and the handling of the same in a dynamic manner. In some examples, dynamic communicative processes disclosed herein alert subsequent sub-processes of excursions so that corrective actions may be enacted prior to excess material waste, process time waste and/or safety issues can mature. Examples disclosed herein also facilitate an alternate control system paradigm that is not rigorously aligned with a single process recipe that traditional process control systems adhere-to. For instance, in view of traditional rigorous process recipe conformance, such traditional process control systems fail to produce products with a relatively high degree of quality in response to changes in input material conditions. The disclosed methods, apparatus and articles of manufacture also improve the efficiency of using a computing device by reducing a number of product and/or process re-work instances by identifying the excursions prior to performing operations on the physical parts/ materials. Accordingly, disclosed methods, apparatus, systems and articles of manufacture are directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Example methods, apparatus, systems, and articles of manufacture to manage process excursions are disclosed herein. Further examples and combinations thereof include the following:

Example 1 includes an apparatus to identify an excursion effect in a process control system, the apparatus comprising a digital twin comparer to determine when a product fails to satisfy a tolerance metric of a digital twin at a first time, a sensor characteristics engine to identify a sensor type pattern corresponding to sensor value occurrences preceding the first time, a temporal characteristics analyzer to identify a temporal pattern of the sensor value occurrences preceding the first time, a fingerprint manager to generate a fingerprint corresponding to the a sensor type pattern and the temporal pattern, a node interfacer to determine a number of workstations of the process control system that exhibit the fingerprint, and an excursion statistics calculator to invoke a corrective action for respective ones of the number of workstations, the corrective action based on a threshold count of the number of workstations that exhibit the fingerprint.

Example 2 includes the apparatus as defined in example 1, further including a sensor characteristics engine to identify the sensor pattern based on sensor types corresponding to sensor value occurrences preceding a first time, the first time indicative of when the product fails to satisfy the tolerance metric of the digital twin.

Example 3 includes the apparatus as defined in example 2, further including a temporal characteristics analyzer to identify the sensor pattern based on temporal occurrences of sensor values preceding the first time.

Example 4 includes the apparatus as defined in example 1, further including a sensor characteristics engine to identify a sensor type pattern corresponding to sensor value occurrences preceding a first time, the first time associated with a failure to satisfy the tolerance metric, and a temporal characteristics engine to identify a temporal pattern of the sensor value occurrences preceding the first time.

Example 5 includes the apparatus as defined in example 1, further including a classification manager to classify the fingerprint against a knowledgebase of known process excursion fingerprints.

Example 6 includes the apparatus as defined in example 5, wherein the classification manager is to invoke a preventative maintenance procedure as the corrective action in response to a match of the fingerprint in the knowledgebase.

Example 7 includes the apparatus as defined in example 5, wherein the classification manager is to prevent operational disparity of the process control system by transmitting the classified fingerprint to the number of workstations of the process control system within a threshold amount of time.

Example 8 includes the apparatus as defined in example 7, wherein the node interfacer is to identify a threshold count of transmission confirmations within the threshold amount of time, the threshold count associated with a number of workstations associated with the process control system.

Example 9 includes the apparatus as defined in example 1, wherein the fingerprint manager is to add the fingerprint to a fingerprint excursion database when no match of the fingerprint in a knowledge database occurs.

Example 10 includes a non-transitory computer readable storage medium comprising computer readable instructions that, when executed, cause at least one processor to at least determine when a product fails to satisfy a tolerance metric of a digital twin, generate a fingerprint corresponding to a sensor pattern, determine a number of workstations of a process control system that exhibit the fingerprint, and invoke a corrective action for respective ones of the number of workstations, the corrective action based on a threshold count of the number of workstations that exhibit the fingerprint.

Example 11 includes the non-transitory computer readable storage medium as defined in example 10, wherein the instructions, when executed, cause the at least one processor to identify the sensor pattern based on sensor types corresponding to sensor value occurrences preceding a first time, the first time indicative of when the product fails to satisfy the tolerance metric of the digital twin.

Example 12 includes the non-transitory computer readable storage medium as defined in example 11, wherein the instructions, when executed, cause the at least one processor to identify the sensor pattern based on temporal occurrences of sensor values preceding the first time.

Example 13 includes the non-transitory computer readable storage medium as defined in example 10, wherein the instructions, when executed, cause the at least one processor to identify a sensor type pattern corresponding to sensor value occurrences preceding a first time, the first time associated with a failure to satisfy the tolerance metric, and identify a temporal pattern of the sensor value occurrences preceding the first time.

Example 14 includes the non-transitory computer readable storage medium as defined in example 10, wherein the instructions, when executed, cause the at least one processor to classify the fingerprint against a knowledgebase of known process excursion fingerprints.

Example 15 includes the non-transitory computer readable storage medium as defined in example 14, wherein the instructions, when executed, cause the at least one processor to invoke a preventative maintenance procedure as the corrective action in response to a match of the fingerprint in the knowledgebase.

Example 16 includes the non-transitory computer readable storage medium as defined in example 14, wherein the instructions, when executed, cause the at least one processor to prevent operational disparity of the process control system by transmitting the classified fingerprint to the number of workstations of the process control system within a threshold amount of time.

Example 17 includes the non-transitory computer readable storage medium as defined in example 16, wherein the instructions, when executed, cause the at least one processor to identify a threshold count of transmission confirmations within the threshold amount of time, the threshold count associated with a number of workstations associated with the process control system.

Example 18 includes the non-transitory computer readable storage medium as defined in example 10, wherein the instructions, when executed, cause the at least one processor to add the fingerprint to a fingerprint excursion database when no match of the fingerprint in a knowledge database occurs.

Example 19 includes a computer-implemented method to identify an excursion effect in a process control system, the method comprising determining, by executing an instruction with at least one processor, when a product fails to satisfy a tolerance metric of a digital twin, generating, by executing an instruction with the at least one processor, a fingerprint corresponding to a sensor pattern, determining, by executing an instruction with the at least one processor, a number of workstations of a process control system that exhibit the fingerprint, and invoking, by executing an instruction with the at least one processor, a corrective action for respective ones of the number of workstations, the corrective action based on a threshold count of the number of workstations that exhibit the fingerprint.

Example 20 includes the method as defined in example 19, further including identifying the sensor pattern based on sensor types corresponding to sensor value occurrences preceding a first time, the first time indicative of when the product fails to satisfy the tolerance metric of the digital twin.

Example 21 includes the method as defined in example 20, further including identifying the sensor pattern based on temporal occurrences of sensor values preceding the first time.

Example 22 includes the method as defined in example 19, further including identifying a sensor type pattern corresponding to sensor value occurrences preceding a first time, the first time associated with a failure to satisfy the tolerance metric, and identifying a temporal pattern of the sensor value occurrences preceding the first time.

Example 23 includes the method as defined in example 19, further including classifying the fingerprint against a knowledgebase of known process excursion fingerprints.

Example 24 includes the method as defined in example 23, further including invoking a preventative maintenance procedure as the corrective action in response to a match of the fingerprint in the knowledgebase.

Example 25 includes the method as defined in example 23, further including preventing operational disparity of the process control system by transmitting the classified fingerprint to the number of workstations of the process control system within a threshold amount of time.

Example 26 includes the method as defined in example 25, further including identifying a threshold count of transmission confirmations within the threshold amount of time, the threshold count associated with a number of workstations associated with the process control system.

Example 27 includes the method as defined in example 19, further including adding the fingerprint to a fingerprint excursion database when no match of the fingerprint in a knowledge database occurs.

Example 28 includes an apparatus to apply mutations to a process configuration, the apparatus comprising an output predictor to determine a predicted output of a product based on an upstream representation of the product, a digital twin comparer to determine whether the a predicted output of a product satisfies tolerance values associated with a digital twin corresponding to an expected output of the product, determine difference values between the predicted output and a representation of the product after a manufacturing step, and determine a count of violations of the difference values, and a mutation integrator to apply mutations to a process configuration associated with the digital twin when the count of violations satisfies a threshold value.

Example 29 includes the apparatus as defined in example 28, further including an output predictor to prevent material waste by determining the predicted output of the product by analyzing an upstream representation of the product.

Example 30 includes the apparatus as defined in example 29, further including a temporal pattern determiner to determine metrics corresponding to process stability by identifying a short-term process pattern and a long-term process pattern.

Example 31 includes the apparatus as defined in example 30, wherein the temporal pattern determiner is to identify the short-term process pattern based on a first quantity of previous process iterations, and identify the long-term process pattern based on a second quantity of previous process iterations, the first quantity lower than the second quantity.

Example 32 includes the apparatus as defined in example 30, wherein the temporal pattern determiner is to determine a trending behavior by comparing the short-term process pattern and the long-term process pattern based on an absolute difference measurement.

Example 33 includes the apparatus as defined in example 30, wherein the temporal pattern determiner is to refrain from applying mutations to the process configuration when the short-term process pattern matches the long-term process pattern, and apply mutations to the process configuration when the short-term process pattern deviates from the long-term process pattern by a threshold value.

Example 34 includes a non-transitory computer readable storage medium comprising computer readable instructions that, when executed, cause at least one processor to at least determine whether a predicted output of a product satisfies tolerance values associated with a digital twin corresponding to an expected output of the product, determine difference values between the predicted output and a representation of the product after a manufacturing step, determine a count of violations of the difference values, and apply mutations to a process configuration associated with the digital twin when the count of violations satisfies a threshold value.

Example 35 includes the non-transitory computer readable storage medium as defined in example 34, wherein the instructions, when executed, cause the at least one processor to prevent material waste by determining the predicted output of the product by analyzing an upstream representation of the product.

Example 36 includes the non-transitory computer readable storage medium as defined in example 35, wherein the instructions, when executed, cause the at least one processor to determine metrics corresponding to process stability by identifying a short-term process pattern and a long-term process pattern.

Example 37 includes the non-transitory computer readable storage medium as defined in example 36, wherein the instructions, when executed, cause the at least one processor to identify the short-term process pattern based on a first quantity of previous process iterations, and identify the long-term process pattern based on a second quantity of previous process iterations, the first quantity lower than the second quantity.

Example 38 includes the non-transitory computer readable storage medium as defined in example 36, wherein the instructions, when executed, cause the at least one processor to determine a trending behavior by comparing the short-term process pattern and the long-term process pattern based on an absolute difference measurement.

Example 39 includes the non-transitory computer readable storage medium as defined in example 36, wherein the instructions, when executed, cause the at least one processor to refrain from applying mutations to the process configuration when the short-term process pattern matches the long-term process pattern, and apply mutations to the process configuration when the short-term process pattern deviates from the long-term process pattern by a threshold value.

Example 40 includes a computer-implemented method to apply mutations to a process configuration, the method comprising at least determining, by executing an instruction with at least one processor, whether a predicted output of a product satisfies tolerance values associated with a digital twin corresponding to an expected output of the product, determine, by executing an instruction with the at least one processor, difference values between the predicted output and a representation of the product after a manufacturing step, determine, by executing an instruction with the at least one processor, a count of violations of the difference values, and apply mutations, by executing an instruction with the at least one processor, to a process configuration associated with the digital twin when the count of violations satisfies a threshold value.

Example 41 includes the method as defined in example 40, further including preventing material waste by determining the predicted output of the product by analyzing an upstream representation of the product.

Example 42 includes the method as defined in example 41, further including determining metrics corresponding to process stability by identifying a short-term process pattern and a long-term process pattern.

Example 43 includes the method as defined in example 42, further including identifying the short-term process pattern based on a first quantity of previous process iterations, and identifying the long-term process pattern based on a second quantity of previous process iterations, the first quantity lower than the second quantity.

Example 44 includes the method as defined in example 42, further including determining a trending behavior by comparing the short-term process pattern and the long-term process pattern based on an absolute difference measurement.

Example 45 includes the method as defined in example 42 further including refraining from applying mutations to the process configuration when the short-term process pattern matches the long-term process pattern, and applying mutations to the process configuration when the short-term process pattern deviates from the long-term process pattern by a threshold value.

What is claimed is:

1. An apparatus to identify an excursion effect in a process control system, the apparatus comprising:
   digital twin comparer circuitry to determine when a product fails to satisfy a tolerance metric of a digital twin;
   fingerprint manager circuitry to generate a fingerprint corresponding to a sensor pattern;
   classification manager circuitry to classify the fingerprint against a knowledgebase of known process excursion fingerprints;
   node interfacer circuitry to:
      prevent operational disparity of the process control system by transmitting the classified fingerprint to a number of workstations of the process control system within a threshold amount of time; and
      identify a threshold count of transmission confirmations of the classified fingerprint, the threshold count of transmission confirmations corresponding to the number of workstations of the process control system; and
   excursion statistics calculator circuitry to invoke a corrective action for respective ones of the number of workstations, the corrective action based on a threshold count of the number of workstations that exhibit the fingerprint.

2. The apparatus as defined in claim 1, further including sensor characteristics engine circuitry to identify the sensor pattern based on sensor types corresponding to sensor value occurrences preceding a first time, the first time indicative of when the product fails to satisfy the tolerance metric of the digital twin.

3. The apparatus as defined in claim 2, further including temporal characteristics analyzer circuitry to identify the sensor pattern based on temporal occurrences of sensor values preceding the first time.

4. The apparatus as defined in claim 1, further including:
   sensor characteristics engine circuitry to identify a sensor type pattern corresponding to sensor value occurrences preceding a first time, the first time associated with a failure to satisfy the tolerance metric; and
   temporal characteristics engine circuitry to identify a temporal pattern of the sensor value occurrences preceding the first time.

5. The apparatus as defined in claim 1, wherein the classification manager circuitry is to invoke a preventative maintenance procedure as the corrective action in response to a match of the fingerprint in the knowledgebase.

6. The apparatus as defined in claim 1, wherein the fingerprint manager circuitry is to add the fingerprint to a fingerprint excursion database when no match of the fingerprint in a knowledge database occurs.

7. A non-transitory computer readable storage medium comprising computer readable instructions to cause processor circuitry to at least:
   determine when a product fails to satisfy a tolerance metric of a digital twin;
   generate a fingerprint corresponding to a sensor pattern;
   classify the fingerprint against a knowledgebase of known process excursion fingerprints;
   prevent operational disparity of a process control system by transmitting the classified fingerprint to a number of workstations of the process control system within a threshold amount of time;
   identify a threshold count of transmission confirmations of the classified fingerprint, the threshold count of transmission confirmations corresponding to the number of workstations of the process control system; and
   invoke a corrective action for respective ones of the number of workstations, the corrective action based on a threshold count of the number of workstations that exhibit the fingerprint.

8. The non-transitory computer readable storage medium as defined in claim 7, wherein the instructions cause the processor circuitry to identify the sensor pattern based on sensor types corresponding to sensor value occurrences preceding a first time, the first time indicative of when the product fails to satisfy the tolerance metric of the digital twin.

9. The non-transitory computer readable storage medium as defined in claim 8, wherein the instructions cause the processor circuitry to identify the sensor pattern based on temporal occurrences of sensor values preceding the first time.

10. The non-transitory computer readable storage medium as defined in claim 7, wherein the instructions cause the processor circuitry to:

identify a sensor type pattern corresponding to sensor value occurrences preceding a first time, the first time associated with a failure to satisfy the tolerance metric; and identify a temporal pattern of the sensor value occurrences preceding the first time.

11. The non-transitory computer readable storage medium as defined in claim 7, wherein the instructions cause the processor circuitry to invoke a preventative maintenance procedure as the corrective action in response to a match of the fingerprint in the knowledgebase.

12. The non-transitory computer readable storage medium as defined in claim 7, wherein the instructions cause the processor circuitry to add the fingerprint to a fingerprint excursion database when no match of the fingerprint in the knowledge database occurs.

13. A computer-implemented method to identify an excursion effect in a process control system, the method comprising:

determining, by executing an instruction with at least one processor, when a product fails to satisfy a tolerance metric of a digital twin;

generating, by executing an instruction with the at least one processor, a fingerprint corresponding to a sensor pattern;

classifying, by executing an instruction with the at least one processor, the fingerprint against a knowledgebase of known process excursion fingerprints;

preventing, by executing an instruction with the at least one processor, operational disparity of the process control system by transmitting the classified fingerprint to a number of workstations of the process control system within a threshold amount of time;

identifying, by executing an instruction with the at least one processor, a threshold count of transmission confirmations of the classified fingerprint, the threshold count of transmission confirmations corresponding to the number of workstations of the process control system; and invoking, by executing an instruction with the at least one processor, a corrective action for respective ones of the number of workstations, the corrective action based on a threshold count of the number of workstations that exhibit the fingerprint.

14. The method as defined in claim 13, further including identifying the sensor pattern based on sensor types corresponding to sensor value occurrences preceding a first time, the first time indicative of when the product fails to satisfy the tolerance metric of the digital twin.

15. The method as defined in claim 14, further including identifying the sensor pattern based on temporal occurrences of sensor values preceding the first time.

16. The method as defined in claim 13, further including:

identifying a sensor type pattern corresponding to sensor value occurrences preceding a first time, the first time associated with a failure to satisfy the tolerance metric; and identifying a temporal pattern of the sensor value occurrences preceding the first time.

17. The method as defined in claim 13, further including invoking a preventative maintenance procedure as the corrective action in response to a match of the fingerprint in the knowledgebase.

* * * * *